(12) United States Patent
Tamaki

(10) Patent No.: US 11,665,438 B2
(45) Date of Patent: May 30, 2023

(54) ELECTRONIC DEVICE CAPABLE OF ACQUIRING LINE-OF-SIGHT INFORMATION

(71) Applicant: CANON KABUSHIKI KAISHA, Tokyo (JP)

(72) Inventor: Yoshihito Tamaki, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 52 days.

(21) Appl. No.: 17/178,516

(22) Filed: Feb. 18, 2021

(65) Prior Publication Data

US 2021/0258477 A1    Aug. 19, 2021

(30) Foreign Application Priority Data

Feb. 19, 2020    (JP) .............................. JP2020-026018

(51) Int. Cl.
*H04N 23/63* (2023.01)
*G06F 3/01* (2006.01)
*H04N 23/80* (2023.01)

(52) U.S. Cl.
CPC ............ *H04N 23/80* (2023.01); *G06F 3/013* (2013.01); *H04N 23/631* (2023.01)

(58) Field of Classification Search
CPC ......... H04N 5/23229; H04N 5/232933; H04N 5/232127; H04N 5/23219; G06F 3/013
See application file for complete search history.

(56) References Cited

U.S. PATENT DOCUMENTS

| | | | |
|---|---|---|---|
| 6,388,707 B1* | 5/2002 | Suda ................ | H04N 5/232123 348/333.03 |
| 2017/0039869 A1* | 2/2017 | Gleim ...................... | G09B 7/00 |
| 2019/0033966 A1* | 1/2019 | Odagiri .................. | G09G 5/377 |
| 2019/0034038 A1* | 1/2019 | Rudchenko ............. | G06F 3/013 |
| 2019/0147618 A1* | 5/2019 | Sugimoto ............ | G06V 40/193 348/222.1 |
| 2020/0121179 A1* | 4/2020 | Prusky ................. | A61B 3/0091 |
| 2021/0357023 A1* | 11/2021 | Muta ....................... | G06F 3/013 |
| 2022/0019281 A1* | 1/2022 | Olson ..................... | G06F 3/017 |

FOREIGN PATENT DOCUMENTS

JP    2015-022208 A    2/2015

* cited by examiner

*Primary Examiner* — Hung H Lam
(74) *Attorney, Agent, or Firm* — Cowan, Liebowitz & Latman, P.C.

(57) ABSTRACT

An electronic device according to the present invention, includes at least one memory and at least one processor which function as: an acquisition unit configured to acquire a first line-of-sight information and a second line-of-sight information generated by mutually different statistical methods as line-of-sight information relating to a line of sight of a user looking at a display surface; and a processing unit configured to perform first processing on a basis of the first line-of-sight information and second processing different from the first processing on a basis of the second line-of-sight information.

14 Claims, 12 Drawing Sheets

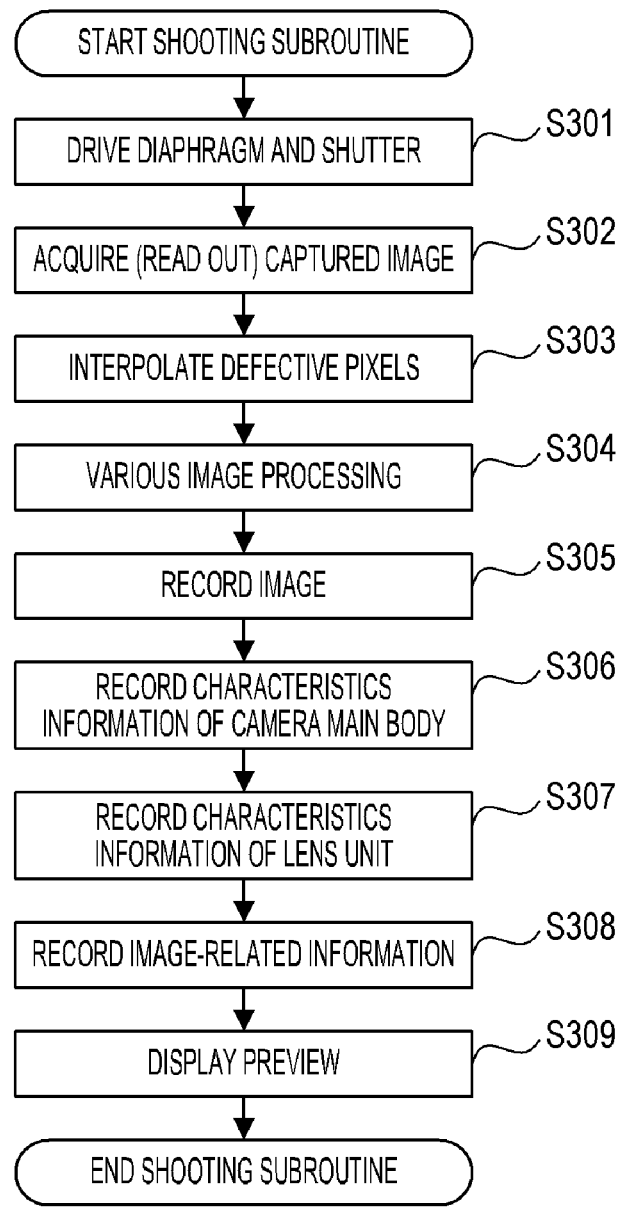

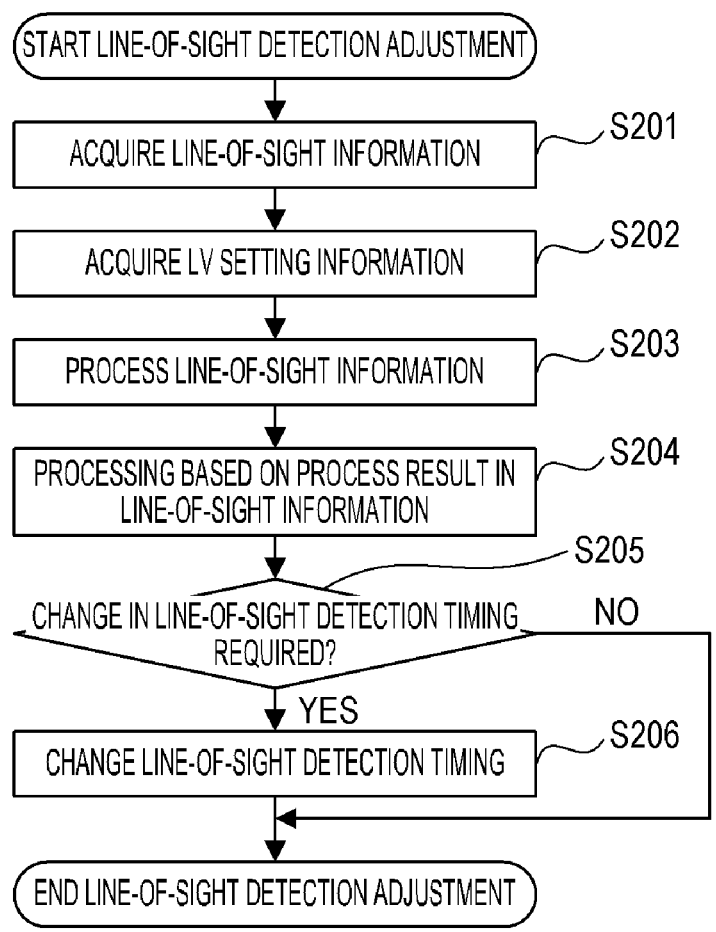

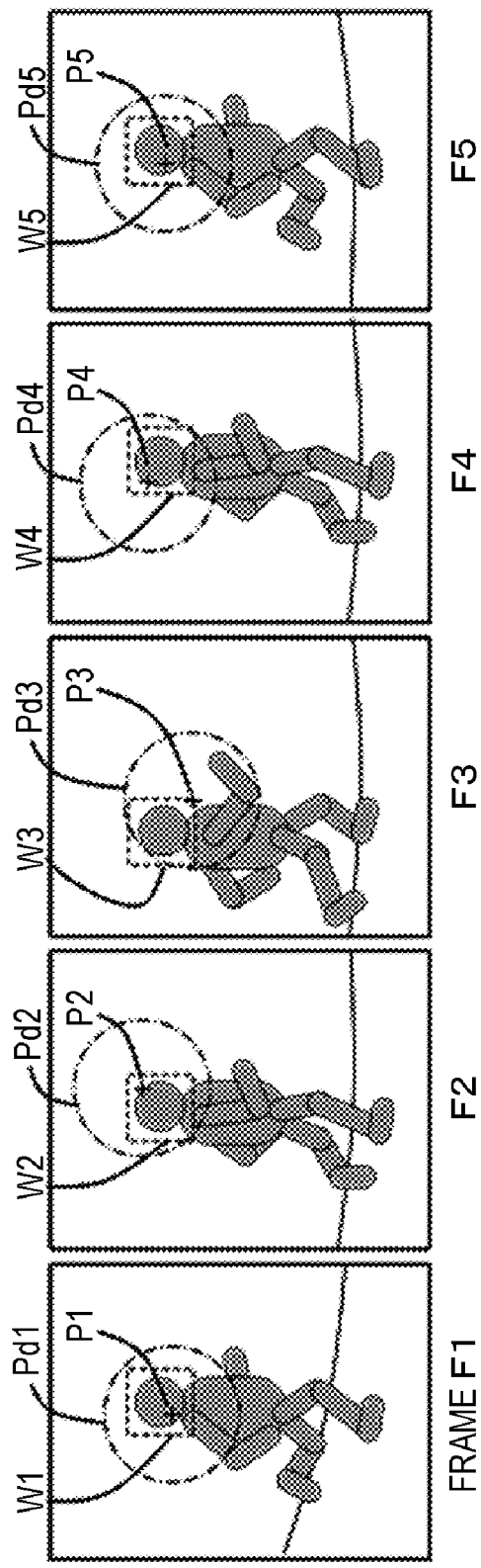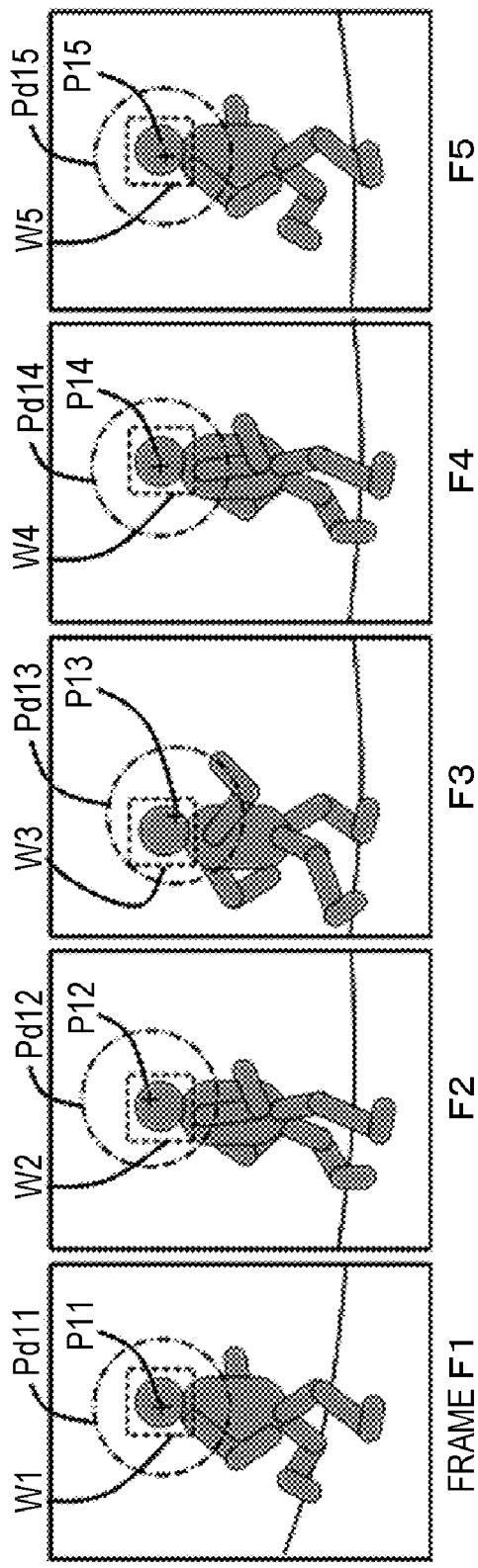

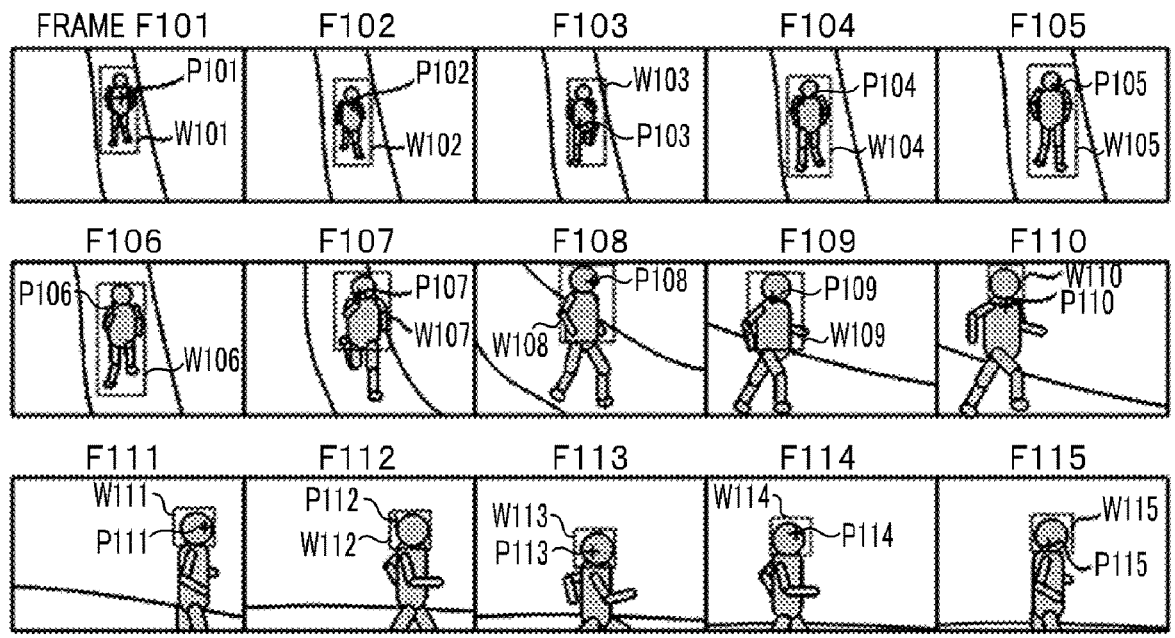
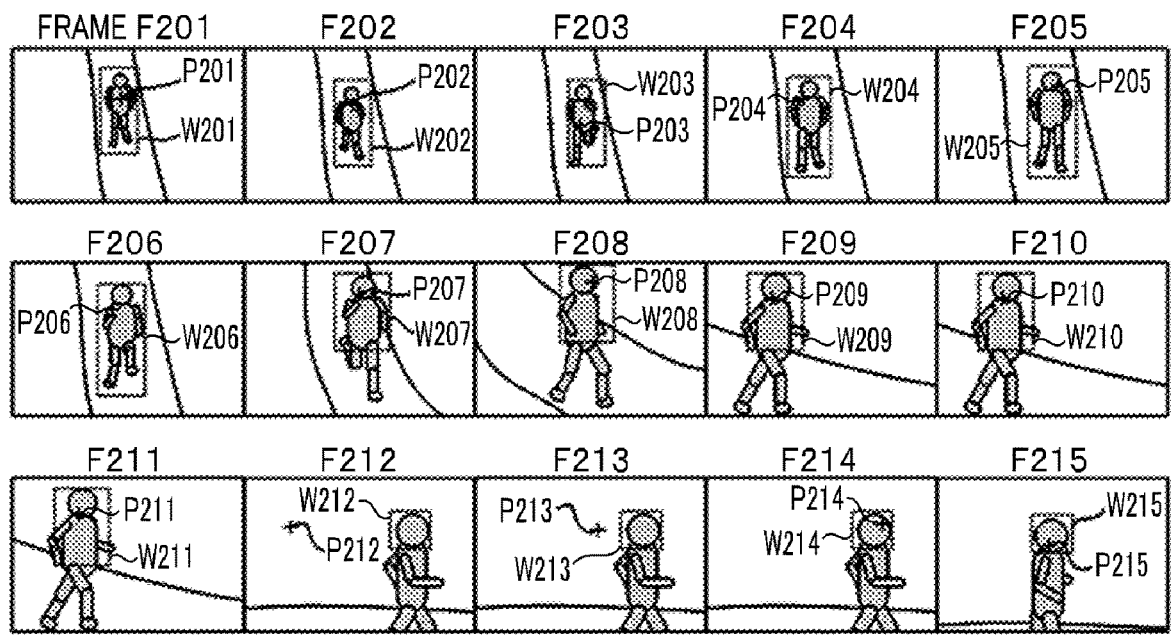

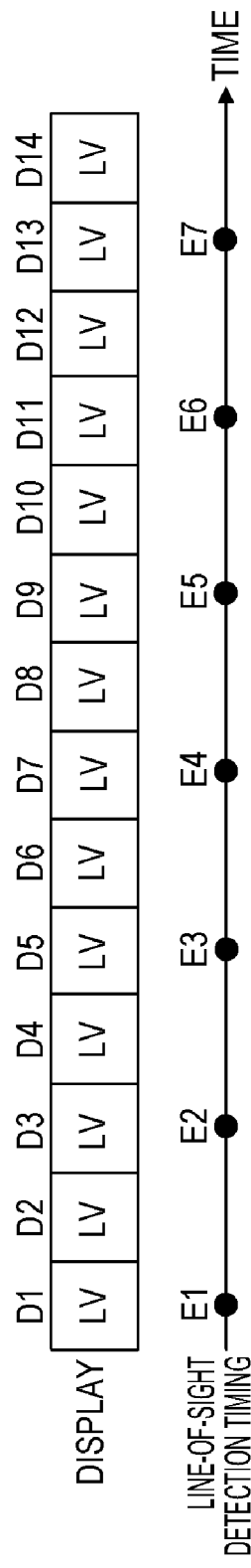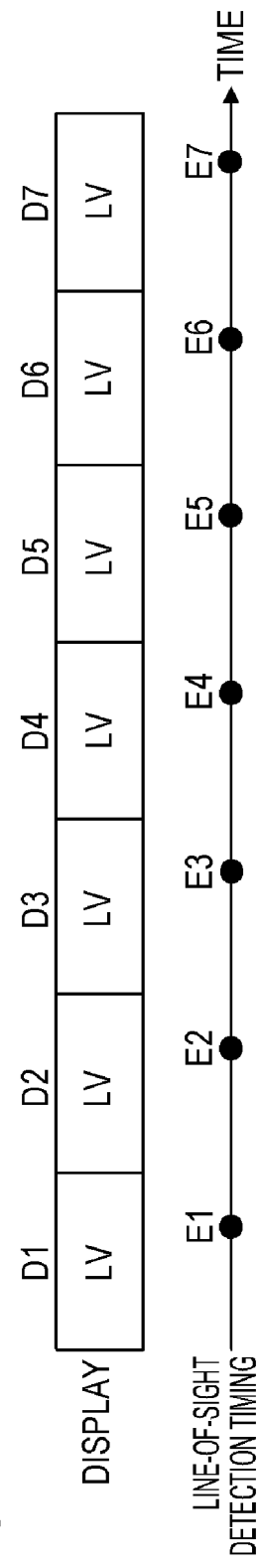

ELECTRONIC DEVICE CAPABLE OF ACQUIRING LINE-OF-SIGHT INFORMATION

BACKGROUND OF THE INVENTION

Field of the Invention

The present invention relates to an electronic device capable of acquiring line-of-sight information relating to user's lines of sight.

Description of the Related Art

Japanese Patent Application Laid-open No. 2015-22208 discloses a method of selecting a focus point based on a detected line of sight of a user (photographer) looking into the view field of a viewfinder. The imaging apparatus disclosed in Japanese Patent Application Laid-open No. 2015-22208 allows selection of a focus point in accordance with the degree of priority given to each of a plurality of focus point selection methods so that the focus point can be selected as intended by the user. The imaging apparatus disclosed in Japanese Patent Application Laid-open No. 2015-22208 includes a viewfinder known as an optical finder that allows the user to view an optical image formed on a focusing screen.

Meanwhile, there have been imaging apparatuses having an electronic viewfinder instead of the optical finder in recent years. An electronic viewfinder is a display apparatus that reproduces images acquired by an image sensor that receives light beams passing through a photographing optical system. While an imaging apparatus with an optical finder includes a beam splitter, an imaging apparatus with an electronic viewfinder does not need a beam splitter and therefore is able to detect a focus or an object in a wider area within the shooting range.

Sometimes, however, in the existing imaging apparatus capable of detecting the user's line of sight (gaze position) and equipped with an electronic viewfinder, the process based on the detection result of the line of sight may not be performed favorably.

For example, as opposed to the display in an optical finder, in the display in an electronic viewfinder, processing that is implemented to the signal acquired by the image sensor is changed, and the delay time until an image is displayed (display lag time) may be varied. Also, the interval of updating the displayed image (display update interval) may be varied. Accordingly, the user views the image, in which display lag time and display update interval are varied.

This may obstruct the user from aligning the gaze position precisely with the position the user wishes to view, or may cause the user to take more time to align the gaze position. This in turn leads to a failure in detecting the point the user aims to look at as the gaze position, hence, the process based on the detection result is not performed favorably. More specifically, the user's intended position may not be displayed as the gaze position, or the user's intended position may not be selected as a focus point.

By lengthening the period of detecting the gaze position or by broadening the area output as the detection result of the gaze position, the point the user aims to look at can be detected as the gaze position. However, the process that requires instantaneity such as selection of a focus point cannot be performed favorably. If consideration (priority) is given to the process instantaneity, the display quality of the gaze position is lowered.

SUMMARY OF THE INVENTION

The present invention provides a technique that enables processing to be performed favorably based on results of line-of-sight detection.

An electronic device according to the present invention, includes at least one memory and at least one processor which function as: an acquisition unit configured to acquire a first line-of-sight information and a second line-of-sight information generated by mutually different statistical methods as line-of-sight information relating to a line of sight of a user looking at a display surface; and a processing unit configured to perform first processing on a basis of the first line-of-sight information and second processing different from the first processing on a basis of the second line-of-sight information.

Further features of the present invention will become apparent from the following description of exemplary embodiments with reference to the attached drawings.

BRIEF DESCRIPTION OF THE DRAWINGS

FIG. 5 is a flowchart of a shooting sub-routine according to the embodiment;

FIG. 6 is a flowchart of a process of making adjustments in line-of-sight detection according to the embodiment:

FIG. 7A and FIG. 7B are diagrams for explaining the reasons why the plurality of processing steps according to the embodiment are performed;

FIG. 8A and FIG. 8B are diagrams for explaining the reasons why the processing according to the embodiment is performed.

FIG. 12A and FIG. 12B are timing charts of live view display and other processes according to the embodiment.

DESCRIPTION OF THE EMBODIMENTS

Figure 1:
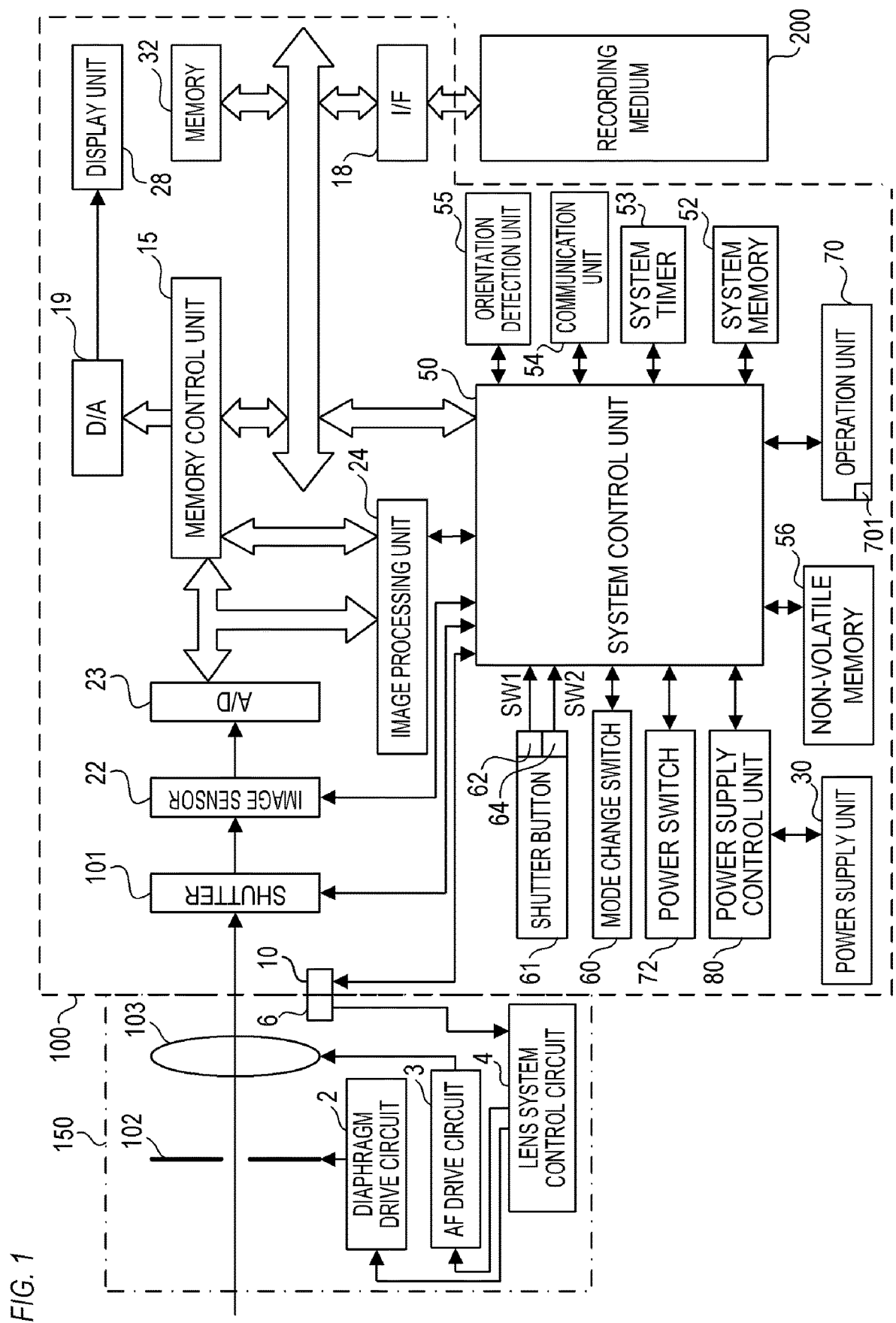
FIG. 1 is a block diagram illustrating a configuration example of an imaging apparatus according to the embodiment.

The present invention will be hereinafter described in detail based on its illustrative embodiments with reference to the accompanying drawings. The following embodiments shall not limit the present invention. While a plurality of features are described below, it does not mean that all of them are essential for the present invention. The plurality of features described below may be combined in any way.

Same or similar constituent elements in the accompanying drawings are given the same reference numerals to omit repetitive description.

The following embodiments will be described in relation to a case where the present invention is applied to an imaging apparatus (specifically, a lens-changeable digital camera). However, the present invention is applicable to any electronic device to which a line-of-sight information acquisition function (function that acquires line-of-sight information relating to a line of sight of a user) can be installed. Such electronic device includes a video camera, computer equipment (personal computer, tablet computer, media player, PDA, etc.), mobile phone, smartphone, game machine, robot, drone, drive recorder, and so on. These are only examples and the present invention can be applied to other electronic devices. While the digital camera described below includes a line-of-sight detection function, imaging function, display function, etc., the present invention is also applicable to a configuration that has these functions separately installed on several mutually communicable devices (e.g., a main machine and a remote controller).

[Configuration]

FIG. 1 is a block diagram illustrating a configuration example of a digital camera system as one example of electronic device according to the embodiment of the present invention. The digital camera system includes a main body 100 of a lens-changeable digital camera, and a lens unit 150 removably attached to the main body 100. The lens changeability is not essential for the present invention.

The lens unit 150 includes a communication terminal 6 that makes contact with a communication terminal 10 provided to the main body 100 when attached to the main body 100. Power is supplied from the main body 100 to the lens unit 150 via the communication terminal 10 and communication terminal 6. A lens system control circuit 4 of the lens unit 150 and a system control unit 50 of the main body 100 are mutually communicable via the communication terminal 10 and communication terminal 6.

The lens unit 150 includes a lens assembly 103 that is an imaging optical system composed of a plurality of lenses including a movable lens. The movable lens at least includes a focus lens. Depending on the lens unit 150, one or more of a zoom lens, a blur correction lens, and so on, can further be included. An AF drive circuit 3 includes a motor, an actuator and the like for driving the focus lens. The focus lens is driven by the lens system control circuit 4 controlling the AF drive circuit 3. A diaphragm drive circuit 2 includes a motor actuator and the like for driving a diaphragm 102. The aperture size of the diaphragm 102 is adjusted by the lens system control circuit 4 controlling the diaphragm drive circuit 2.

A mechanical shutter 101 is driven by the system control unit 50 to adjust the exposure time of an image sensor 22. The mechanical shutter 101 is kept fully open when shooting a movie.

The image sensor 22 is a CCD image sensor or a CMOS image sensor, for example. The image sensor 22 includes two-dimensionally arranged multiple pixels, each pixel being provided with one micro lens, one color filter, and one or more opto-electronic conversion units. In this embodiment, each pixel includes a plurality of opto-electronic conversion units and each pixel is configured to be able to output a signal from each of the opto-electronic conversion units. The pixels configured this way enable generation of image signals for captured images, stereoscopic image pairs, and phase-difference AF, from signals read out from the image sensor 22.

Figure 2A:
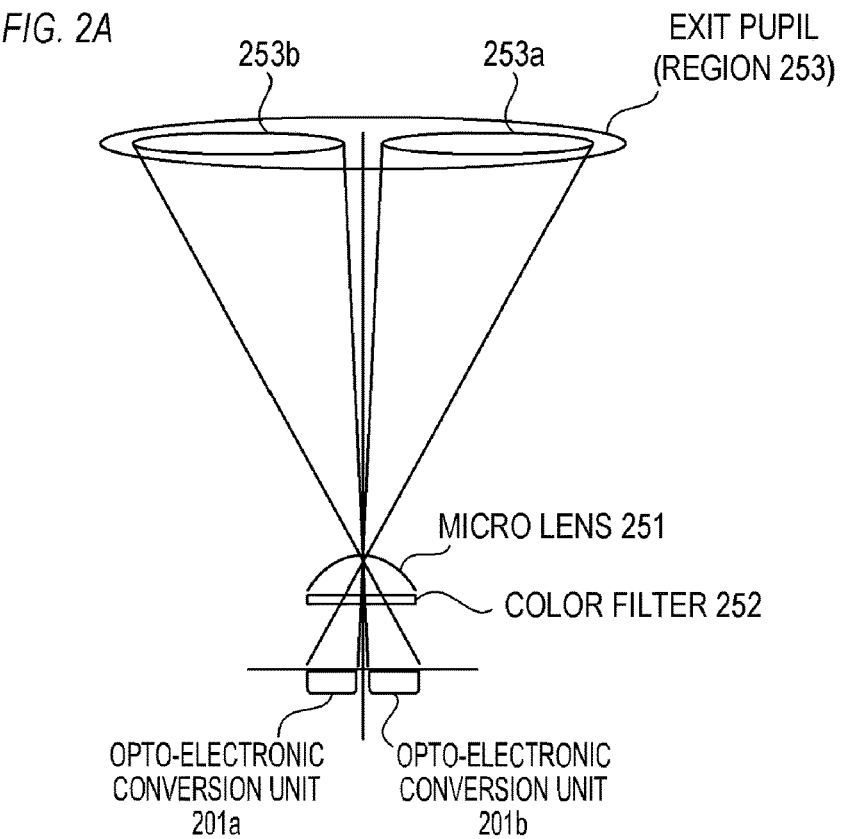
FIG. 2A and FIG. 2B are diagrams illustrating an example of correspondence between an exit pupil and an optoelectronic conversion unit of an imaging apparatus according to the embodiment.

FIG. 2A is a schematic diagram illustrating the correspondence between an exit pupil of the lens unit 150 and each of opto-electronic conversion units when each pixel of the image sensor 22 has two opto-electronic conversion units.

The two opto-electronic conversion units 201a and 201b provided to the pixel share one color filter 252 and one micro lens 251. Light that has passed through a partial region 253a and a partial region 253b of the emission exit (region 253) enters the opto-electronic conversion unit 201a and the opto-electronic conversion unit 201b, respectively.

Therefore, a pair of stereoscopic images are formed by images respectively formed by signals read out from the opto-electronic conversion units 201a and opto-electronic conversion units 201b of the pixels included in a given pixel area. The stereoscopic image pair can be used as image signals (A image signal and B image signal) for phase-difference AF. Further, a normal image signal (captured image) can be obtained by adding signals respectively read out from the opto-electronic conversion units 201a and opto-electronic conversion units 201b of each pixel.

Figure 2B:
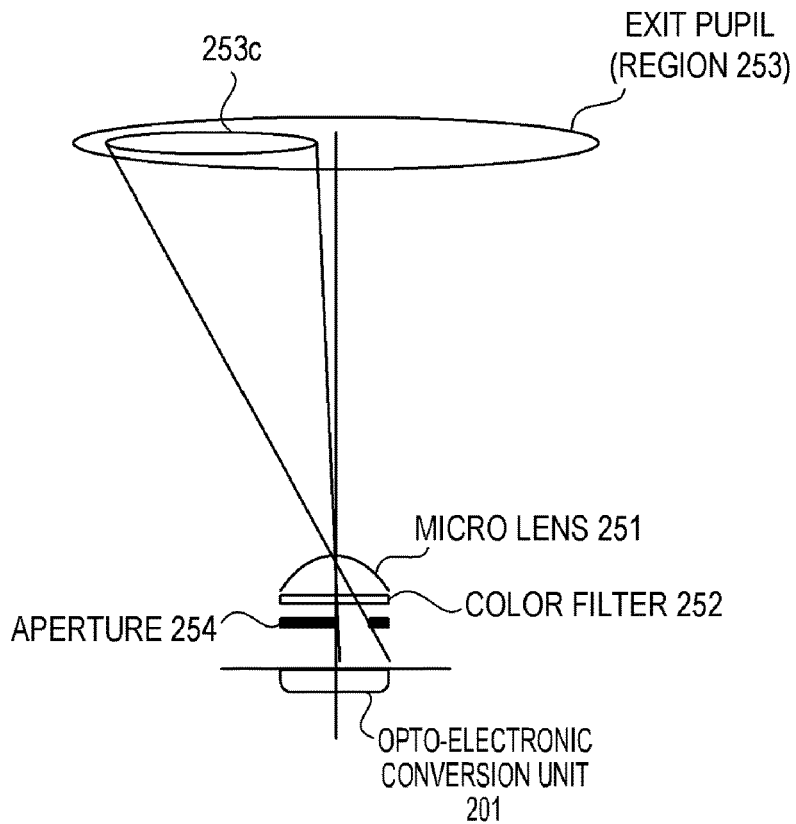

In this embodiment, each pixel of the image sensor 22 functions both as the pixel for generating a signal for phase-difference AF (focus detection pixel) and the pixel for generating a normal image signal (imaging pixel). Optionally, some of the pixels of the image sensor 22 may be configured as the focus detection pixels, and the other pixels may be configured as imaging pixels. FIG. 2B illustrates an example of correspondence between a focus detection pixel and a region 253 of the exit pupil through which the incident light passes. The opto-electronic conversion unit 201 of the focus detection pixel illustrated in FIG. 2B functions similarly to the opto-electronic conversion unit 201b of FIG. 2A with the use of the aperture 254. It is practically possible to set a focus detection area of any size anywhere by distributing the focus detection pixel illustrated in FIG. 2B, and another type of focus detection pixel that functions similarly to the opto-electronic conversion unit 201a of FIG. 2A over the entire image sensor 22.

While the configuration illustrated in FIG. 2A and FIG. 2B is that of an image sensor for obtaining images to be recorded, which is used as the sensor for phase-difference AF, the present invention can be embodied for any other types of AF, such as for autofocusing that allows setting of a focus detection area of any size and location. For example, the present invention is applicable also to a configuration that uses contrast AF. In the case of using only the contrast AF, each pixel has only one opto-electronic conversion unit.

Referring back to FIG. 1, an A/D converter 23 is used for converting an analog image signal output from the image sensor 22 into a digital image signal (image data). The A/D converter 23 may be included in the image sensor 22.

The image data (RAW image data) output by the A/D converter 23 is processed as required at an image processing unit 24, and stored in a memory 32, via a memory control unit 15. The memory 32 is used as a buffer memory for storing image data or audio data temporarily, or as a video memory for a display unit 28.

The image processing unit 24 applies predetermined image processing to the image data to generate a signal or image data, or acquire and/or generate various pieces of information. The image processing unit 24 may be a dedicated hardware circuit such as an ASIC designed to realize specific functions, for example, or a configuration with a processor such as a DSP executing software to realize specific functions.

The image processing the image processing unit 24 applies here includes pre-processing, color interpolation, correction, detection, data processing, evaluation value calculation, and so on. Pre-processing includes signal amplification, reference level adjustment, defect pixel correction, and so on. Color interpolation is a process of interpolating the values of color components not contained in the image data and also called demosaicing. Correction includes white balance adjustment, correction of luminance of the image, correction of optical aberrations of the lens unit 150, color calibration, and so on. Detection includes detection and tracking of a characteristic area (e.g., face area, human body area), identification of a person, and so on. Data processing includes scaling, encoding, decoding, header information generation, and so on. Evaluation value calculation includes calculation of evaluation values of pairs of image signals for phase-difference AF, or for contrast AF, evaluation values used for automatic exposure control, and so on. These are examples of image processing the image processing unit 24 can carry out, and should not be understood as limiting the image processing carried out by the image processing unit 24. The evaluation value calculation may be performed by the system control unit 50.

A D/A converter 19 generates an analog signal suited to display at the display unit 28 from the image data for display stored in the memory 32, and supplies the generated analog signal to the display unit 28. The display unit 28 includes a liquid crystal display apparatus, for example, and executes display on the basis of the analog signal from the D/A converter 19 on a display surface.

Shooting a movie (imaging control) while displaying the footage (display control) continuously allows the display unit 28 to function as an electronic view finder (EVF). The movie displayed to cause the display unit 28 to function as an EVF is called a live view image. The display unit 28 may be provided inside the main body 100 to be viewed through an eyepiece, or may be provided on a housing surface of the main body 100 to be viewable without an eyepiece. The display unit 28 may be provided to both of inside the main body 100 and on the housing surface.

The system control unit 50 is a CPU (also called MPU or microprocessor), for example. The system control unit 50 controls the operations of the main body 100 and the lens unit 150 by reading a program stored in a non-volatile memory 56 into a system memory 52 and executing the program to realize the functions of the camera system. The system control unit 50 sends various commands to the lens system control circuit 4 via communication through the communication terminals 10 and 6 to control the operation of the lens unit 150.

The non-volatile memory 56 stores the program executed by the system control unit 50, various setting values of the camera system, image data of a GUI (Graphical User Interface), and so on. The system memory 52 is a main memory the system control unit 50 uses when executing a program. The data (information) stored in the non-volatile memory 56 may be re-writable.

The system control unit 50, as one of the operations it performs, carries out an automatic exposure control (AE) process based on an evaluation value generated by the image processing unit 24 or itself, to determine a shooting condition. The shooting conditions for capturing a still image are the shutter speed, aperture value, and sensitivity, for example. The system control unit 50 determines one or more of the shutter speed, aperture value, and sensitivity in accordance with an AE mode that has been set. The system control unit 50 controls the aperture value (aperture size) of the diaphragm mechanism in the lens unit 150. The system control unit 50 also controls the operation of the mechanical shutter 101.

The system control unit 50 drives the focus lens of the lens unit 150 on the basis of an evaluation value or an amount of defocus generated by the image processing unit 24 or itself, to perform autofocus detection (AF) causing the lens assembly 103 to focus on an object within a focus detection area.

A system timer 53 is a built-in clock and used by the system control unit 50.

An operation unit 70 includes a plurality of input devices (button, switch, dial, and so on) the user can operate. Some of the input devices of the operation unit 70 have a name corresponding to the assigned function. While a shutter button 61, a mode change switch 60, a power switch 72 are illustrated separately from the operation unit 70 for convenience, these are included in the operation unit 70. When the display unit 28 is a touch display including a touchscreen, the touchscreen is also included in the operation unit 70. Operations of the input devices included in the operation unit 70 are monitored by the system control unit 50. When the system control unit 50 detects an operation of an input device, the system control unit 50 executes processing in accordance with the detected operation.

The shutter button 61 includes a first shutter switch 62 that turns on and outputs a signal SW1 when half-pressed, and a second shutter switch 64 that turns on and outputs a signal SW2 when fully pressed. When the system control unit 50 detects the signal SW1 (first shutter switch 62 ON), the system control unit executes a preparatory operation for shooting a still image. The preparatory operation includes the AE process and AF process. When the system control unit 50 detects the signal SW2 (second shutter switch 64 ON), the system control unit executes shooting of a still image (imaging and recording operations) in accordance with the shooting condition determined by the AE process.

The operation unit 70 of this embodiment includes a line-of-sight detection unit 701 that detects the line of sight (direction of line of sight) of a user and outputs the detection results (line-of-sight information regarding the user's line of sight). The system control unit 50 can execute various control processes in accordance with the line-of-sight information provided by the line-of-sight detection unit 701. Although the line-of-sight detection unit 701 is not a component directly operated by the user, it is included in the operation unit 70 because the line of sight detected by the line-of-sight detection unit 701 is dealt with as an input.

Figure 3A:
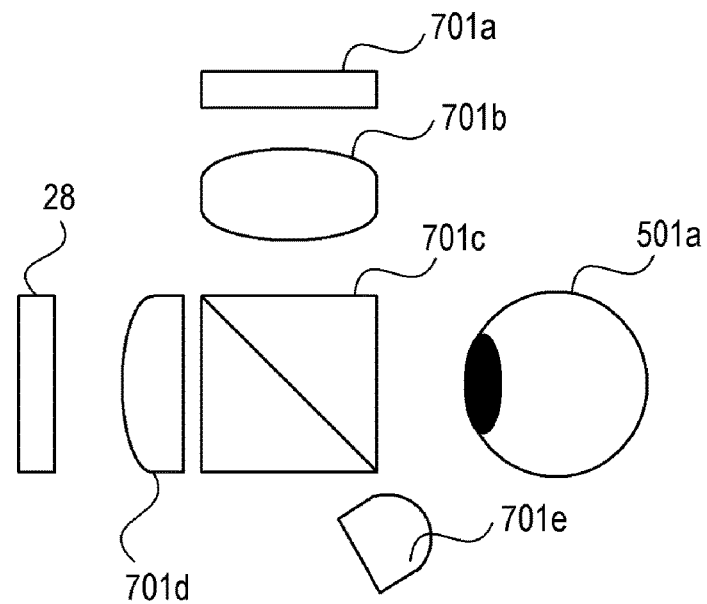
FIG. 3A and FIG. 3B are diagrams illustrating a configuration example of a line-of-sight detection unit according to the embodiment.

FIG. 3A is a schematic side view illustrating a configuration example of the line-of-sight detection unit 701 inside a finder. The line-of-sight detection unit 701 detects the rotation angle of the optical axis of the eyeball 501a of a user who is looking at the display unit 28 provided inside the main body 100 through the eyepiece of the finder. The line-of-sight detection unit is able to locate the position in the display unit 28 the user is gazing at (point of gaze in the displayed image) based on the detected direction of line of sight.

The display unit 28 displays a live view image, for example, and the user peering in through the window of the eyepiece can observe the displayed contents of the display unit 28 through an eye lens 701d and a dichroic mirror 701c. A light source 701e can emit infrared light toward the direction of the eyepiece window (toward outside of the main body 100). When the user is peering into the finder, the infrared light emitted by the light source 701e is reflected by the eyeball 501a and returns into the finder. The infrared light incident in the finder is reflected toward a light-receiving lens 701b by the dichroic mirror 701c.

The light-receiving lens 701b forms an infrared image of the eyeball on the imaging plane of an image sensor 701a. The image sensor 701a is a two-dimensional imaging device having a filter for the infrared imaging. The image sensor 701a for the line-of-sight detection may have a fewer number of pixels than that of the image sensor 22 for shooting. The eyeball image captured by the image sensor 701a is sent to the system control unit 50. The system control unit 50 locates the positions of the retinal reflection of infrared light and the pupil in the eyeball image and detects the line-of-sight direction from the positional relationship between them. The system control unit 50 locates the position in the display unit 28 the user is gazing at (point of gaze in the displayed image) based on the detected line-of-sight direction. Alternatively, the positions of the retinal reflection and the pupil in the eyeball image may be located by the image processing unit 24, and the system control unit 50 may obtain their locations from the image processing unit 24.

Figure 3B:
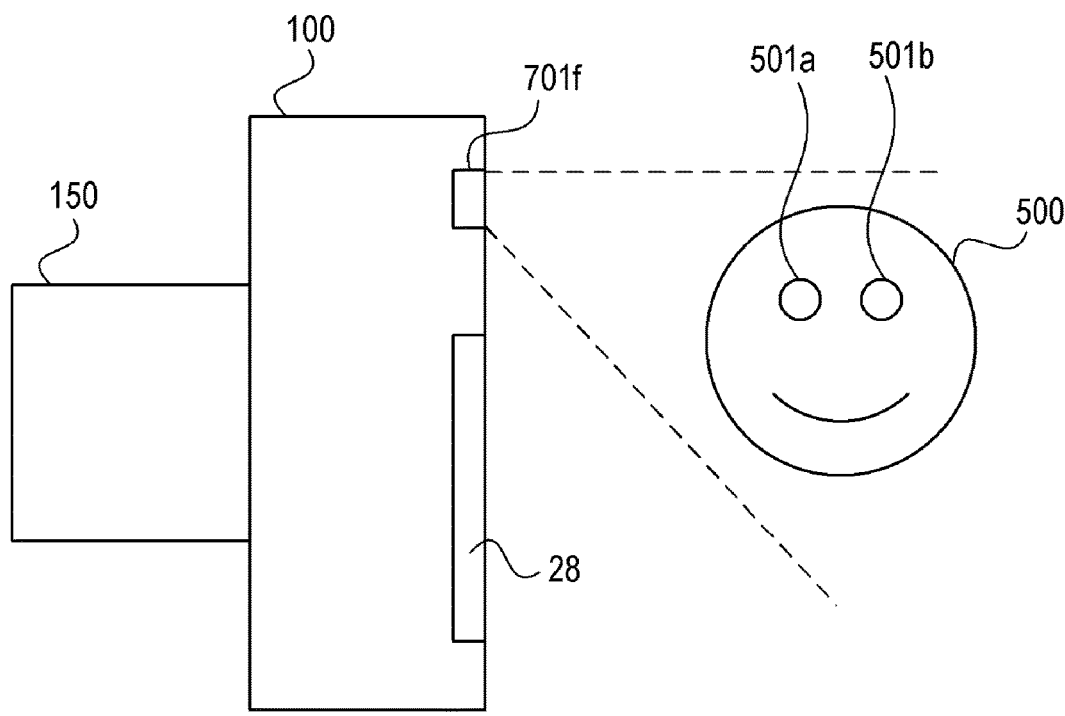

The present invention does not depend on the method of detecting the line of sight or the configuration of the line-of-sight detection unit. The configuration of the line-of-sight detection unit 701 is not limited to the one illustrated in FIG. 3A. For example, as illustrated in FIG. 3B, the line of sight may be detected based on an image captured by a camera 701f disposed near the display unit 28 on the back side of the main body 100. The angle of view of the camera 701f indicated with broken lines is determined such that the face of a user shooting while looking at the display unit 28 is captured. The line-of-sight direction can be detected based on an image of an eye area (area including at least one of the eyeball 501a and the eyeball 501b) that is located in an image captured by the camera 701f In the case of using infrared image sensory, a light source 701e may be disposed near the camera 701f to capture the image of an object inside the angle of view while projecting infrared light. In this case, the method of detecting the line-of-sight direction from the obtained image may be similar to that of FIG. 3A. In the case of using visible light image sensory, no light need to be projected. When using visible light images, the line-of-sight direction can be detected from the positional relationship between the inner corner of the eye and the iris in the eye area.

Referring back to FIG. 1, a power supply control unit 80 is composed of a battery detection circuit, a DC-DC converter, a switch circuit that switches the blocks to be powered, and so on, and detects the presence or absence of a battery being mounted, the type of battery, and remaining battery charge. The power supply control unit 80 controls the DC-DC converter on the basis of the detection results and instructions from the system control unit 50, and supplies a necessary voltage to various units including a recording medium 200 for a necessary period of time.

A power supply unit 30 includes a battery, an AC adapter, and so on. An I/F 18 is an interface for the recording medium 200 such as a memory card, a hard disk, and so on. Data files such as captured images and audio are recorded in the recording medium 200. The data files recorded in the recording medium 200 are read out through the 1/F 18, and can be played back via the image processing unit 24 and the system control unit 50.

A communication unit 54 realizes communication with an external device by at least one of wireless communication and wired communication. Images captured by the image sensor 22 (captured images, including live view images), and images recorded in the recording medium 200 can be sent to the external device via the communication unit 54. Image data and various other pieces of information can be received from an external device via the communication unit 54.

An orientation detection unit 55 detects the orientation of the main body 100 relative to the direction of gravity. The orientation detection unit 55 may be an angular velocity sensor, or an angular velocity sensor. The system control unit 50 can record orientation information in accordance with the orientation detected by the orientation detection unit 55 during shooting in the data file in which the image data obtained by the shooting is stored. The orientation information can be used, for example, for displaying the recorded image in the same orientation as when it was captured.

The main body 100 of this embodiment can carry out various control processes to make a characteristic area detected by the image processing unit 24 an appropriate image. For example, the main body 100 can carry out autofocus detection (AF) for causing the characteristic area to come into focus, and automatic exposure control (AE) for giving a correct exposure to the characteristic area. The main body 100 can also carry out automatic white balance for setting a correct white balance for the characteristic area, and automatic flash adjustment for regulating the amount of light to achieve a correct brightness for the characteristic area. Control processes to correctly display the characteristic area are not limited to these. The image processing unit 24 applies a known method to a live view image, for example, detects areas determined to comply with the definition of a predetermined characteristic as characteristic areas, and outputs information such as the position, size, and credibility of each characteristic area to the system control unit 50. The present invention does not depend on the type of the characteristic area or the method of detecting the characteristic area. Since a known method can be used to detect characteristic areas, the description of the method of detecting characteristic areas is omitted.

Feature areas can also be used for detecting object information. When the characteristic area is a face area, for example, whether the red-eye effect is appearing, whether the eyes are closed, or expressions (e.g., smile) are detected as object information. The object information is not limited to these.

This embodiment allows for selection of one characteristic area (main object area) that is to be used for various control processes or for obtaining object information, using the line of sight of the user, from a plurality of characteristic areas that are for example multiple image areas of varying sizes and positions. A user's act of directing the line of sight such as to be detected by the line-of-sight detection unit 701 can be called an input of line of sight.

[Operation]

Figure 4:
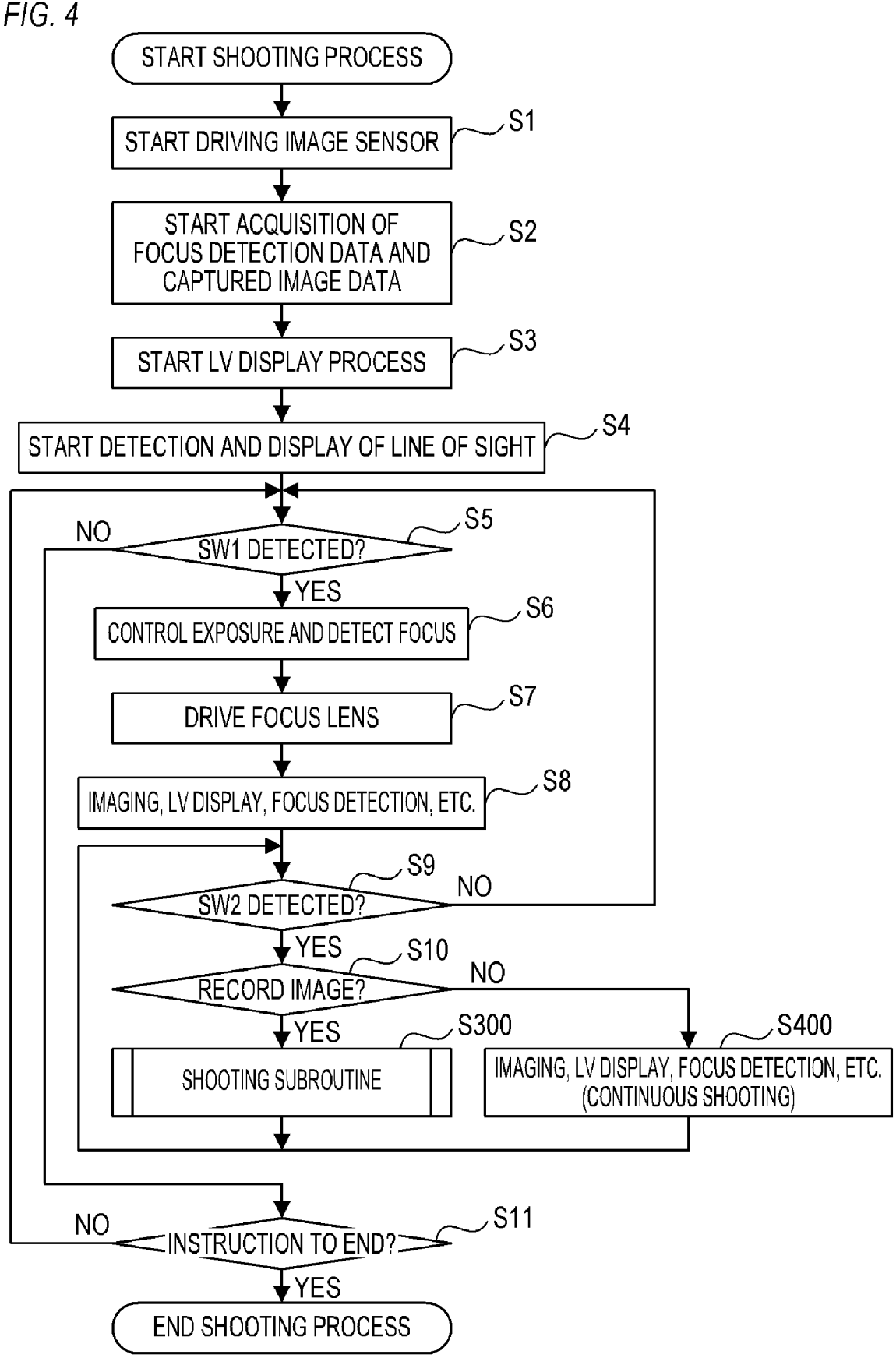
FIG. 4 is a flowchart illustrating an example of a shooting process according to the embodiment.

A shooting process performed in the main body 100 is described below with reference to FIG. 4. FIG. 4 is a flowchart of the shooting process according to the embodiment. The process of FIG. 4 is started upon start-up of the main body 100 in a shooting mode, or upon setting of a shooting mode as the mode of the main body 100.

At step S1, the system control unit 50 starts driving the image sensor 22, to initiate acquisition of imaging data (image). Images having a sufficient resolution at least for one of focus detection, object detection, and live view display are successively obtained. Since the driving operation here is performed for shooting a movie for live view display, images are taken using a process known as an electronic shutter operation in which charge is accumulated for a time in accordance with a live view frame rate each time imaging data is read out. Live view display is a display method that allows the display unit 28 to function as an electronic view finder (EVF), which shows an object substantially in real time. The live view is displayed for example for the user (photographer) to check the shooting range or shooting conditions. The frame rate for live view display is 30 frames/s (imaging interval of 33.3 ms) or 60 frames/s (imaging interval of 16.6 ms), for example.

At step S2, the system control unit 50 starts a process of acquiring focus detection data and captured image data from the current imaging data. The focus detection data includes data of a first image and a second image that are a pair of stereoscopic images in a focus detection area. For example, the data of pixels that form the first image and second image is respectively obtained from the opto-electronic conversion units 201a and 201b of FIG. 2A. Captured image data is the data of the captured image, which is obtained by adding up the data of the first image and second image, and applying color interpolation and the like by the image processing unit 24. This way, focus detection data and captured image data can be acquired in one shooting. In the case where the focus detection pixels and imaging pixels are configured as different pixels, the captured image data is acquired by an interpolation process or the like for obtaining pixel values at the positions of the focus detection pixels.

At step S3, the system control unit 50 starts a live view display process. In the live view display process, the system control unit 50 generates an image for live view display from the current captured image (captured image data), using the image processing unit 24, and displays the generated image in an image display area of the display unit 28. The image display area is one of the entire area of the display surface of the display unit 28, the entire area of a screen (such as a window) presented in the display unit 28, and some area of the display surface or the screen. The image for live view display may be an image reduced in accordance with the resolution of the display unit 28, for example. The image processing unit 24 can perform a reduction process when generating the captured image. In this case, the system control unit 50 displays the generated captured image (image after the reduction process) in the display unit 28. As described above, the live view display that shows the object substantially in real time allows the user to adjust the composition or exposure conditions during the shooting with ease while checking the live view display. Moreover, in this embodiment, the main body 100 is capable of detecting an object such as the face of a person or an animal from the captured image. Accordingly, a frame or the like indicating the area of the object being detected can also be shown in the live view display.

At step S4, the system control unit 50 starts line-of-sight detection and focus detection. In line-of-sight detection, the line-of-sight detection unit 701 acquires line-of-sight information that indicates the line-of-sight position (user's gaze position) on the display surface of the display unit 28 at a predetermined time interval in association with the captured image the user was looking at. At step S4, the system control unit 50 also starts display of a predetermined item (such as a circle) at the gaze position on the display surface of the display unit 28 in order to notify the user of the detected gaze position. Focus detection will be described later.

At step S5, the system control unit 50 determines whether or not the signal SW1 (first shutter switch 62 ON; instruction to get set for shooting; half-pressed state of the shutter button 61) has been detected. The system control unit 50 advances the process to step S6 if it determines that the signal SW1 has been detected, and advances the process to step S11 if it determines that the signal SW1 has not been detected.

At step S6, the system control unit 50 sets a focus detection area, and carries out focus detection that was started at step S4. Here, the system control unit 50 sets a focus detection area based on the results of line-of-sight detection started at step S4 (successively detected lines of sight). The detected gaze positions contain errors due to various reasons relative to the user's intended position of the object. In this embodiment, statistical methods of processing the detected gaze position (line-of-sight information), or controlling the line-of-sight detection timing (timing at which the gaze position is detected) are changed in accordance with the situation so that more precise (more favorable) line-of-sight information is acquired. More details will be given later. The post-process line-of-sight information (after the gaze position has been processed or after the line-of-sight detection timing has been controlled) may be acquired from outside. At step S6, the focus detection area is set, with the use of this post-process line-of-sight information. At this step, the gaze position may be aligned with the center of the focus detection area, or not. When there are plural candidates for focus detection area such as areas around detected objects, the area around one of the plurality of detected objects closest to the gaze position (including the gaze position) may be linked to the gaze position and set as the focus detection area. The system control unit 50 detects a focus position (focus point) where the image is in focus in the focus detection area. From the step S6 onwards, focus detection using the line-of-sight information (including the setting of a focus detection area) is repeatedly carried out. The method of setting a focus detection area before the acquisition of line-of-sight information is not limited to a particular one. For example, an area of an object selected by the user as the user wishes may be set as the focus detection area.

In focus detection, an image displacement (phase difference) between the first image and the second image that are the pair of stereoscopic images in the focus detection area is calculated, and a defocus amount (vector including magnitude and direction) in the focus detection area is calculated from the image displacement. The focus detection is explained in more specific terms below.

First, the system control unit 50 applies shading correction to the first image and second image to reduce the difference in light amount (difference in brightness) between the first image and the second image. After the shading correction the system control unit 50 applies a filtering process to the first image and second image to extract a spatial frequency image (data) for the detection of a phase difference.

After the filtering process, the system control unit 50 next performs a shifting process of relatively shifting the first image and second image in a pupil splitting direction to calculate a correlation value that indicates the matching degree of the first image and second image.

The correlation value COR(s1) can be calculated using the following formula 1, where A(k) represents data of a k-th pixel of the first image after the filtering process, B(k) represents data of a k-th pixel of the second image after the filtering process. W represents an area of number k corresponding to a focus detection area, s1 represents an amount of shift in the shifting process, and Γ1 represents an area of the amount of shift s1 (shifting area).

[Math. 1]

$$COR(s1) = \sum_{k \in W} |A(k) - B(k-s1)| \quad s1 \in \Gamma 1 \quad \text{(Formula 1)}$$

First, the shifting process with an amount of shift s1 matches data B(k−s1) of a (k−s1)th pixel of the second image after the filtering process to the data A(k) of a k-th pixel of the first image after the filtering process. Next, the data B(k−s1) is subtracted from the data A(k) and absolute values of subtraction results are produced. Then the total sum of the produced absolute values in an area W corresponding to the focus detection area is calculated as the correlation value COR(s1). The amount of correlation may be calculated for each line, and added up over several lines for each amount of shift, as required.

Next, the system control unit 50 produces an image displacement p1, which is a real-valued amount of shift with which the correlation value becomes smallest, by subpixel operation from the correlation value. The system control unit 50 then multiplies the calculated image displacement p1 with a conversion coefficient K1 that corresponds to an image height of the focus detection area, an F value of the imaging lens (image-forming optical system; imaging optical system), and an exit pupil distance, to produce the defocus amount.

At step S7, the system control unit 50 drives the focus lens based on the defocus amount detected (calculated) at step S6. When the detected defocus amount is smaller than a predetermined value, the focus lens need not necessarily be driven.

At step S8, the system control unit 50 performs the processes started at steps S1 to S4 (imaging, live view display, line-of-sight detection, gaze position display, and focus detection). Focus detection is performed in the same manner as that of step S6 (focus detection using the line-of-sight information). The process of step S8 may be performed in parallel with the process of step S7 (driving of the focus lens). The focus detection area may be changed based on a change in the live view display (captured image) or a change in the gaze position.

At step S9, the system control unit 50 determines whether or not the signal SW2 (second shutter switch 64 ON; instruction to shoot; fully-pressed state of the shutter button 61) has been detected. The system control unit 50 advances the process to step S10 if it determines that the signal SW2 has been detected, and returns the process to step S5 if it determines that the signal SW2 has not been detected.

At step S10, the system control unit 50 determines whether or not the captured image is to be recorded (whether the image is to be shot). The system control unit 50 advances the process to step S300 if it determines that captured image is to be recorded, and advances the process to step S400 if it determines that the captured image is not to be recorded. In this embodiment, continuous shooting (successive shooting) is started by the long press of the second shutter switch 64, and the processes of shooting (recording of captured image) and focus detection are switched over during the continuous shooting. The processes may be switched every time an image is captured such that shooting and focus detection are performed alternately. The processes may be switched such that focus detection is performed every several times of shooting (e.g., three times). This way, focus detection can be performed favorably without significantly reducing the number of images taken per unit time.

At step S300, the system control unit 50 executes a shooting subroutine. The shooting subroutine will be described in detail later. After step S300, the process is returned to step S9.

At step S400, similarly to step S8, the system control unit 50 performs the processes started at steps S1 to S4 (imaging, live view display, line-of-sight detection, gaze position display, and focus detection). The display period and display update rate (interval) of captured images, display lag and so on at step S400 are different from those of step S8 because of the frame rate of the continuous shooting (shooting frame rate) and the process of generating images to be recorded (recorded images) from captured images. The process is returned to step S9 after step S400.

The user's gaze position is considerably affected when the display period, display update rate (interval), or display lag of the captured image undergo a change. In this embodiment, statistical methods of processing the gaze position or controlling the line-of-sight detection timing are changed in a favorable manner in accordance with such a change in the display state considering that errors occur in the detected gaze position. This way, the gaze position can be acquired accurately (favorably) irrespective of the change in the display state. The acquired gaze position (line-of-sight information) is used for the display of the gaze position, setting of a focus detection area, and linking with an object area, as mentioned above. More details will be given later.

As described above, if the signal SW1 is not detected at step S5, the process goes to step S11. At step S11, the system control unit 50 determines whether or not there has been an instruction (operation) to end the shooting process. An ending instruction is, for example, an instruction to change the mode of the main body 100 from the shooting mode to other modes, or an instruction to turn off the main body 100. The system control unit 50 ends the shooting process of FIG. 4 if it determines that there has been an ending instruction, and returns the process to step S5 if it determines that there has not been an ending instruction.

Next, the shooting subroutine executed at S300 of FIG. 4 will be described in detail with reference to FIG. 5. FIG. 5 is a flowchart of the shooting subroutine according to the embodiment.

At step S301, the system control unit 50 executes exposure control and determines shooting conditions (such as shutter speed, aperture value, and shooting sensitivity). Any known technique may be used to execute the exposure control, for example, based on the brightness information of the captured image. The system control unit 50 controls the operation of the diaphragm 102 and shutter 101 (mechanical shutter) based on the determined aperture value and shutter speed. The system control unit 50 controls the shutter 101 to accumulate a charge in the image sensor 22 for a period in which the image sensor 22 is to be exposed (exposure period).

At step S302 after the exposure period has lapsed, the system control unit 50 acquires (reads out) the captured image for shooting a still image from the image sensor 22. The system control unit 50 also acquires (reads out) a focus detection image, which is one of the first image and the second image that are the pair of stereoscopic images in the focus detection area, from the image sensor 22. The focus detection image is used for detecting a focus state of an object when the recorded image (shot image; image recorded based on the captured image) is reproduced. To reduce the amount of data of the focus detection image, an image with a smaller area than the captured image, or an image having a lower resolution than the captured image may be acquired as the focus detection image. The other one of the first image and the second image can be obtained by calculating a difference between one of the first image and the second image and the captured image. In this embodiment, the captured image and one of the focus detection images are acquired (read out) and recorded, while the other focus detection image is calculated. The following image processing (processing of images) is applied to the captured image and one of the focus detection image thus acquired.

At step S303, the system control unit 50 controls the image processing unit 24 to apply defective pixel interpolation (correction) to the images acquired at step S302. At step S304, the system control unit 50 controls the image processing unit 24 to apply other image processing to the images after the defective pixel interpolation at step S303. Other image processing includes demosaicing (color interpolation), white balancing, gamma correction (gradation correction), color conversion, edge enhancement, encoding, and so on. At step S305, the system control unit 50 records the images processed at steps S303 and S304 (captured image for shooting a still image, and one of the focus detection images) in the memory 32 as an image data file.

At step S306, the system control unit 50 links characteristics information of the main body 100 to the recorded image (captured image) recorded at step S305 and records the same in the memory 32 (and in the memory in the system control unit 50). The characteristics information of the main body 100 include the following, for example:

Information on shooting conditions (such as aperture value, shutter speed, and shooting sensitivity)

Information on image processing applied by the image processing unit 24

Information on sensitivity distribution of the image sensor 22

Information on vinetting caused by light beams inside the main body 100

Information on distance from the attachment surface between the main body 100 and the lens unit 150 to the image sensor 22

Information on production errors

Since the sensitivity distribution is dependent on the on-chip micro lens and opto-electronic conversion units, the information relating to these components may be recorded as information on sensitivity distribution. Information indicative of the sensitivity in accordance with the positions at predetermined distances from the image sensor 22 on the optical axis may be recorded as information on sensitivity distribution. Information indicative of changes in sensitivity relative to the changes in the incident angle of light may be recorded as information on sensitivity distribution.

At step S307, the system control unit 50 links characteristics information of the lens unit 150 to the recorded image recorded at step S305 and records the same in the memory 32 (and in the memory in the system control unit 50). The characteristics information of the lens unit 150 includes, for example, exit pupil information, frame information, focal distance information during shooting, F-number information during shooting, aberration information, production errors information, object distance information linked to the focus lens position during shooting, and so on.

At step S308, the system control unit 50 records image-related information about the recorded image recorded at step S305 in the memory 32 (and in the memory in the system control unit 50). The image-related information includes, for example, information on focus detection operation before the shooting (recording), object movement information, information on the accuracy of focus detection operation, and so on.

At step S309, the system control unit 50 displays the recorded image recorded at step S305 in the display unit 28 (preview display). This allows the user to quickly check the recorded image. While the image for recording at step S305 is generated by applying various processes such as steps S303 and S304, the image for preview display at step S309 may be generated without these various processes since it is an image for a quick check. If an image for preview display is to be generated without these various processes, the time lag between exposure and display can be shortened by performing the preview display at step S309 in parallel with the processes from step S303 onwards.

Next, the process of making adjustments in line-of-sight detection, including change of statistical methods of processing the gaze position (line-of-sight information) or controlling the line-of-sight detection timing, will be described with reference to FIG. 6. FIG. 6 is a flowchart of the process of making adjustments in line-of-sight detection according to the embodiment. The process of FIG. 6 is started upon step S4 in FIG. 4 being carried out, and repeated in parallel with the processes from step S4 onwards.

At step S201, the system control unit 50 acquires information of the gaze position (line-of-sight information) detected by the line-of-sight detection unit 701.

At step S202, the system control unit 50 acquires the live view setting information at the timing when the process of step S201 was carried out (timing when the gaze position was detected). The live view setting information is information such as the display period, display update rate (interval), or display lag of the captured image (frame) in the live view display. In the camera system of this embodiment, the live view setting may affect the detected gaze position and may cause a displacement (misalignment or variation) relative to the user's intended position. Therefore, in this embodiment, change of statistical methods of processing the gaze position or controlling the line-of-sight detection timing is performed, in accordance with the live view setting information. The reasons why the live view setting may cause displacement will be explained later.

At step S203, the system control unit 50 processes the line-of-sight information acquired at step S201 based on the live view setting information acquired at step S202. The processing may include weighted combination of a plurality of lines of sight each corresponding to a plurality of timings (smoothing process; filtering process), a process of thinning successively detected gaze positions, and change of the number of sets of line-of-sight information to be used for determination of a gaze area (sample number). The number of sets of line-of-sight information can also be called the length of period in which line-of-sight information to be used for determination of a gaze area is acquired. In this embodiment, first line-of-sight information and second line-of-sight information are generated by different processing steps (statistical methods). The processing at step S203 will be described in detail later.

At step S204, the system control unit 50 performs a process based on the line-of-sight information generated by the processing (first line-of-sight information and second line-of-sight information). The first processed line-of-sight information is used for the display of the gaze position and the second processed line-of-sight information is used for the setting of the focus detection area.

At step S205, the system control unit 50 determines whether or not change of the timing of the line-of-sight detection (sample timing) needs as the change of statistical methods. Specifically, the system control unit 50 determines whether or not there has been a change in the live view setting information (such as display update rate and display lag). In the shooting process of FIG. 4, the display update rate and display lag change in the transition from the pre-shooting state to continuous shooting. If the system control unit 50 determines that the timing of the line-of-sight detection needs to be changed, i.e., if it determines that there has been a change in the live view setting information, the system control unit 50 advances the process to step S206. On the other hand, if the system control unit 50 determines that the timing of the line-of-sight detection need not be changed, i.e., if it determines that there has been no change in the live view setting information, the system control unit 50 ends the process of making adjustments in line-of-sight detection of FIG. 6. As mentioned above, the process of making adjustments in line-of-sight detection is performed in cycles. Even though it ends here, it is started again from step S201.

At step S206, the system control unit 50 changes the timing of the line-of-sight detection. The process at step S206 is a process for changing the timing of line-of-sight detection for enabling acquisition of line-of-sight information that matches the user's intention when it is hard for the user to see the vicinity of the target object due to a small display update rate or a large display lag. The process at step S206 will be described in detail later.

After the live view setting information has been acquired, there is no restriction on the order of the processes of steps S205 and S206 and other processes. Steps S205 and S206 may be carried out at any time. Alternatively, steps S205 and S206 may be performed in parallel with other processes.

Next, the reason why the first line-of-sight information and the second line-of-sight information are generated by different processing steps (different generating methods; different statistical methods) in the process of step S203 of FIG. 6 will be described with reference to FIG. 7A and FIG. 7B. FIG. 7A and FIG. 7B illustrate one example of a scene being shot in which the live view image is updated at a constant display update rate from frame F1 to frame F5. The display update rate is, for example, 60 fps or 120 fps. Namely, the interval of updating the live view image displayed in the display unit 28 is ⅟60 second or ⅟120 second, for example. FIG. 7A and FIG. 7B show five frames F1 to F5 in chronological order as the screen displayed in the display unit 28. In each frame, items W1 to W5 overlapping the live view image indicate areas of the detected object. Since the object is close up, the head area is being detected.

In each frame, items P1 to P5 and P11 to P15 overlapping the live view image indicate the gaze positions. Items P1 to P5 in FIG. 7A are based on the second line-of-sight information, and items P11 to P15 in FIG. 7B are based on the first line-of-sight information. Item P1, for example, indicating the gaze position of the user looking at the frame F1, would be displayed only after the line-of-sight detection process and the processing, but this delay in display caused by the detection process and the processing is not taken into consideration and item P1 is shown anyway in FIG. 7A. The delay in display caused by the detection process and the processing is not taken into consideration with regard to other items indicating the gaze position in FIG. 7A and FIG. 7B.

In each frame, items Pd1 to Pd5 and Pd11 to Pd15 overlapping the live view image indicate the gaze positions, in a more visible form than items P1 to P5 and P11 to P15. Items Pd1 to Pd5 in FIG. 7A are based on the second line-of-sight information, and items Pd11 to Pd15 in FIG. 7B are based on the first line-of-sight information.

The shapes of the various items described above are not limited to those illustrated (broken-line square, cross, one-dot chain line circle). The gaze position may be indicated with only one of items P1 to P5 and P11 to P15, and one of items Pd1 to Pd5 and Pd1 to Pd15.

Referring to FIG. 7A, one case where the second line-of-sight information is used will be described. The second line-of-sight information is generated by a processing step that generally maintains the detected gaze position as it is. Therefore, the second line-of-sight information can favorably be used for a process that requires instantaneity; in this embodiment, it is used for the setting of a focus detection area. The predetermined process to be carried out on the basis of the second line-of-sight information is not limited to the setting of a focus detection area and may be any process that requires instantaneity. The predetermined process to be carried out on the basis of the first line-of-sight information is not limited to the display of the gaze position, either. Simply, the first line-of-sight information and the second line-of-sight information are used for different predetermined processes. An acquisition method of the second line-of-sight information will be described later.

Using the second line-of-sight information for the setting of a focus detection area enables favorable tracking of an object and allows an area of this object to be set as the focus detection area, for example. In FIG. 7A, items P1 to P5 indicating the gaze position are each located inside items W1 to W5 indicating the object area, so that the object (head) associated with items W1 to W5 is being tracked throughout from frame F1 to frame F5. Accordingly, the area of the object (head) associated with items W1 to W5 is being set as the focus detection area throughout from frame F1 to frame F5.

On the other hand, when the second line-of-sight information is used for the display of the gaze position, the gaze position changes largely in each frame as illustrated by items Pd1 to Pd5, i.e., the gaze position cannot be displayed with good visibility. This phenomenon occurs because it is hard for the user to keep gazing at the same point of an object (e.g., the person's pupil) so that the gaze position varies. Specifically, this phenomenon is caused by inevitable variations in the gaze position even though the user is gazing at a fixed point, and variations in the gaze position caused by viewing a moving object.

Referring to FIG. 7B, one case where the first line-of-sight information is used will be described. The first line-of-sight information is generated by a processing step that reduces the change in the line-of-sight information caused by a change in the line of sight. Namely, this processing makes the change in the first line-of-sight information smaller than the change in the second line-of-sight information relative to a change in the line of sight. An acquisition method of the first line-of-sight information will be described later. In FIG. 7B, because the first line-of-sight information is used for the display of the gaze position, the position of items Pd1l to Pd15 varies less than the position of items Pd1 to Pd5 in FIG. 7A, i.e., the gaze position is being displayed with good visibility. This way, the gaze position can be displayed with good visibility by using the first line-of-sight information.

Next, the reasons why the change of statistical methods of processing the line-of-sight information (step S203 of FIG. 6) or controlling the line-of-sight detection timing (step S206 of FIG. 6) may be necessary will be described with reference to FIG. 8A and FIG. 8B. FIG. 8A and FIG. 8B illustrate an example of one scene being shot. FIG. 8A shows fifteen frames F101 to F115 in chronological order as the screen displayed in the display unit 28. FIG. 8B shows fifteen frames F201 to F215 in chronological order as the screen displayed in the display unit 28. In each frame, items W101 to W115 and W201 to W215 overlapping the live view image indicate areas of a detected object. As the object approaches the viewer, the detected area changes from the entire body to the upper body and to the head.

In each frame, items P101 to P115 and P201 to P215 overlapping the live view image indicate the gaze positions. Items P101 to P115 and P201 to P215 are based on unprocessed line-of-sight information. Item P101, for example, indicating the gaze position of the user looking at the frame F101, would be displayed only after the line-of-sight detection process, but this delay in display caused by the detection process is not taken into consideration in FIG. 8A and item P101 is shown anyway.

FIG. 8A illustrates a case in which the live view image is updated at a constant display update rate from frame F101 to frame F115. The display update rate is, for example, 60 fps or 120 fps.

FIG. 8B illustrates a case in which there is a change in display update rate during the period from frame F201 to frame F215. The live view image stops to be updated because of the change in the display update rate so that the same live view image as that of frame F209 is displayed during the period from frame F209 to F211. Similarly, the same live view image as that of frame F212 is displayed during the period from frame F212 to F214. This phenomenon can occur when the shooting process of FIG. 4 is executed, for example. Specifically, the processes of steps S1 to S9 of FIG. 4 are executed during the period from frame F201 to F209, in which the display update rate of the live view image is constant (e.g., 60 fps). After that, the processes from step S10 onwards of FIG. 4 are executed, and after the transition into the continuous shooting state the display update rate of the live view image changes (e.g., 20 fps) as shown by frames F209 to F215. Acquisition of recorded images during the continuous shooting takes a relatively long processing time as compared to acquisition of live view images because of the reading out of images from the image sensor and the image processing applied to the read-out images. Therefore the display update rate is reduced during the continuous shooting, resulting in the state shown in FIG. 8B.

In FIG. 8A, both the interval of updating the live view image displayed in the display unit 28 (display update interval) and the delay time (display lag time) between acquisition of the live view image (imaging) and display thereof in the display unit 28 are constant. Therefore, stable line-of-sight detection is possible wherein the distance between the object the user wishes to watch (person) and the user's gaze position is relatively short. Even so, the gaze position varies, because it is hard for the user to keep gazing at the same point of an object (e.g., the person's pupil). Specifically, there are inevitable variations in the gaze position even though the user is gazing at a fixed point, and variations in the gaze position caused by viewing a moving object.

Therefore, in this embodiment, statistical methods of processing the line-of-sight information (step S203 in FIG. 6) or controlling the timing of line-of-sight detection (step S206 in FIG. 6) are changed such that a gaze position varies less. How the statistical methods are changed will be described later.

In FIG. 8B, the object position changes largely from frame F211 to frame F212 due to the low display update rate. In such a case, the user may not be able to move the gaze quickly enough so that there may occur a state in which the user is gazing at a point far away from the object (item P212 indicating the gaze position). The user moves the gaze after that so that the gaze position gradually comes closer to the object in frames F213 and F214 (items P213 and P214 indicating the gaze position). As demonstrated above, depending on the display update rate, the user's gaze position may be distanced from the object (the area the user intends to look at). If the focus detection area is set using the gaze position in such a state, e.g., the state of frame F212, the focus detection area cannot be set as intended by the user, and an in-focus state as intended by the user cannot be achieved.

Therefore, in this embodiment, the change of statistical methods of processing the line-of-sight information or controlling the timing of line-of-sight detection is performed, based on the display update rate, such that a gaze position that does not match the user's intention is not used for the setting of the focus detection area. The change of statistical methods will be described later.

While it was mentioned above that the display lag time in FIG. 8B was the same as that of FIG. 8A, the display lag time may change by the transition into the continuous shooting. Specifically, acquisition of recorded images during the continuous shooting takes a relatively long processing time as compared to acquisition of live view images because of the reading out of images from the image sensor and the image processing applied to the read-out images. For this reason the display lag time tends to be long during the continuous shooting. A prolonged display lag time causes the user to feel strange because the display is delayed relative to the operation (e.g., panning) performed to the main body 100. This results in variation in the user's gaze position. Taking such a case into consideration, the change of statistical methods processing the line-of-sight information or controlling the timing of line-of-sight detection may be performed, based on the display lag time, such that a gaze position that does not match the user's intention is not used for the setting of the focus detection area. The change of statistical methods may be performed based on one of the display update rate and the display lag time, or may be performed based on both.

Figure 9:
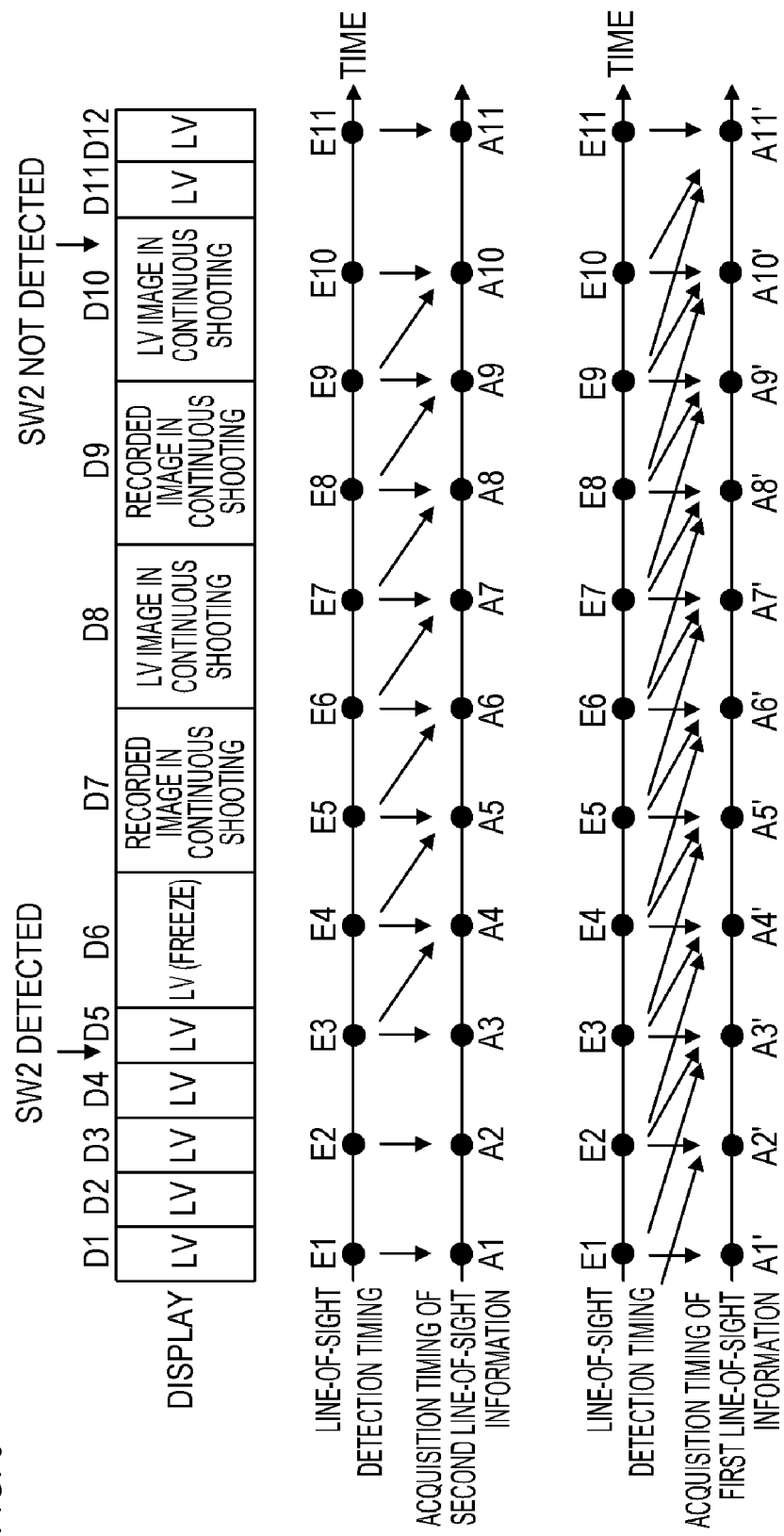
FIG. 9 is a timing chart of live view display and other processes according to the embodiment.

Next, the processing of line-of-sight information will be described with reference to FIG. 9. FIG. 9 is one example of a timing chart of live view display and line-of-sight detection along with the processing.

The upper part of FIG. 9 shows the types and display periods of live view images. In FIG. 9, images D1 to D12 are shown in sequence. Images D1 to D5 are for the live view display (LV) started at step S3 of FIG. 4, which are updated and displayed at 60 fps, for example. The signal SW2 is detected during the display of image D5, and the process goes to step S10 of FIG. 4. Form then onwards, the recorded image acquired at step S300 (images D7 and D9) and the image acquired at step S400 (images D8 and D10 for focus detection) are displayed alternately. Since the display of recorded images requires time as mentioned above, image D6 is not updated (frozen) like images D1 to D5, i.e., the display period of image D6 is extended as compared to the display period of images D1 to D5. The signal SW2 stops being detected during the display of image D10, and the display is returned to the live view started at step S3 of FIG. 4 (images D11 and D12).

The middle part of FIG. 9 illustrates a processing step for obtaining the second line-of-sight information, where black dots indicate line-of-sight detection timings E1 to E11 and acquisition timings A1 to A11 of the second line-of-sight information.

Line-of-sight detection is performed by the line-of-sight detection unit 701 in parallel with shooting and live view display. In FIG. 9, line-of-sight detection is performed at a constant rate irrespective of whether continuous shooting is being used. Specifically, the gaze position is detected at a rate of 30 times/sec. Only, the detection interval between the line-of-sight detection timings E10 and E11 is different from the other detection interval, due to the synchronizing process of synchronizing the line-of-sight detection timing E11 with the display of image D12.

The gaze positions (unprocessed line-of-sight information) detected at the acquisition timings A1 to A3 and A11 of the second line-of-sight information are assumed to be free of a large error because they are acquired during the live view display at 60 fps. Therefore, as indicated by the arrows pointing at these acquisition timings A1 to A3 and A11, the information of the gaze position detected at line-of-sight detection timings E1 to E3 and E11 is acquired as it is as the second line-of-sight information. At acquisition timings A4 to A10, as indicated by the arrows pointing at these acquisition timings, information of an average of a plurality of gaze positions is acquired as second line-of-sight information. The plurality of gaze positions for obtaining second line-of-sight information are, for example, a predetermined number of gaze positions that have been obtained until the acquisition timing of this second line-of-sight information. Specifically, at acquisition timing A4, the information of an average of the gaze position detected at line-of-sight detection timing E3 and the gaze position detected at line-of-sight detection timing E4 is acquired as the second line-of-sight information. As mentioned above, when the display update rate is lowered, or the display lag time is prolonged, the user is not gazing at the intended position (such as the object), because of which there is an error in the detected gaze position (mismatch between the user's intended object position and the detected gaze position). Therefore, in FIG. 9, the information of the detected gaze position is not used as the second line-of-sight information as it is, but is subjected to processing such as an averaging process (weighted combination). Thereby, the influence of an error in the gaze position can be reduced.

The lower part of FIG. 9 illustrates a processing step for obtaining the first line-of-sight information, where black dots indicate line-of-sight detection timings E1 to E11 and acquisition timings A1' to A11' of the first line-of-sight information.

Unlike the processing for obtaining the second line-of-sight information described above, information of an average of a plurality of gaze positions is acquired as the first line-of-sight information at all the acquisition timings A1' to A11', as indicated by the arrows pointing at these acquisition timings. The plurality of gaze positions for obtaining one first line-of-sight information are, for example, a predetermined number of gaze positions that have been obtained until the acquisition timing of this first line-of-sight information. A larger number of gaze positions are used for acquiring the first line-of-sight information than for the second line-of-sight information so that the gaze positions on the basis of the first line-of-sight information will be displayed with good visibility. Specifically, at acquisition timing A4', the information of an average of three gaze positions detected at line-of-sight detection timings E2, E3, and E4 is acquired as the first line-of-sight information. As mentioned above, when the display update rate is lowered, or the display lag time is prolonged, the user may not be gazing at the intended position (such as the object), and there may be an error in the detected gaze position (mismatch between the user's intended object position and the detected gaze position). Therefore, in FIG. 9, the information of the detected gaze position is not used as the first line-of-sight information as it is, but is subjected to processing such as an averaging process (weighted combination). This reduces the influence of an error in the detected gaze position.

Although not shown in FIG. 9, in the case where a blackout image is displayed during the continuous shooting, the gaze position detected during the display of the blackout image may be excluded (removed) from the weighted combination such as averaging.

In FIG. 9, to acquire the second line-of-sight information, the averaging process is performed during the continuous shooting and not before the start of the continuous shooting, while, to acquire the first line-of-sight information, the averaging process is constantly performed. In the averaging process, always the same number of gaze positions are used. The processing for acquiring the first or second line-of-sight information is not limited to this. An error in the gaze position tends to be large during the continuous shooting as compared to before or after the continuous shooting, as mentioned above. Therefore, the averaging process may be performed using a first number of gaze positions before or after the continuous shooting, and the averaging process may be performed using a second number of gaze positions larger than the first number during the continuous shooting. A smaller number of gaze positions used in the averaging process allows for acquisition of (processed) line-of-sight information with more value given to instantaneity (less delay) than error reduction, while, a large number of gaze positions used in the averaging process allows for acquisition of line-of-sight information with more value on error reduction. Namely, the difference in the statistical methods may include a difference in the number (sample number) of line-of-sight information sets to be used for the averaging process.

While FIG. 9 illustrates an example of performing an averaging process (weighted combination in which the plurality of gaze positions are combined with the same weight), the plurality of gaze positions need not necessarily be weighted the same. For example, a gaze position detected at a timing with a large difference from the current time point may be largely different from the current gaze position and the user's intended gaze position. Therefore, a gaze position detected at a timing with a large difference from the current time point may be assigned a smaller weight in the weighted combination. This way, (processed) line-of-sight information with less error can be obtained. The balance in the weight or the number of gaze positions used for the weighted combination may be varied depending on whether the continuous shooting is being used or not. Namely, the difference in the statistical methods may include a difference in the balance of weight in the weighted combination, and a number (sample number) of line-of-sight information sets to be used for the weighted combination.

Figure 10:
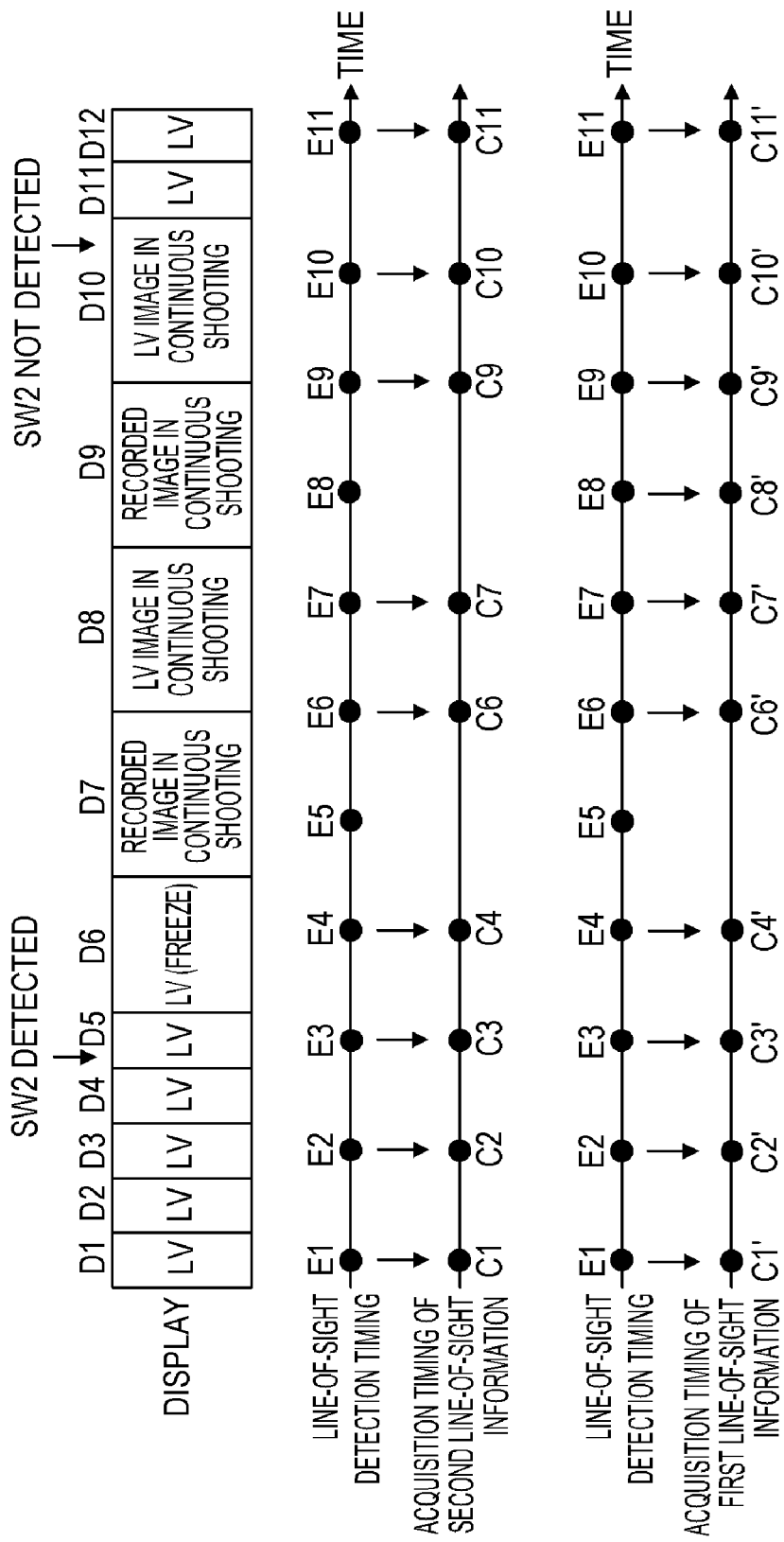
FIG. 10 is a timing chart of live view display and other processes according to the embodiment.

Next, a processing procedure different from that of FIG. 9 will be described with reference to FIG. 10. While FIG. 9 illustrates an example of processing that includes an averaging process, FIG. 10 illustrates an example of processing that includes a thinning process. Namely, FIG. 10 illustrates an example in which the difference in the statistical methods includes a difference in the thinning process. Similarly to FIG. 9, FIG. 10 is one example of a timing chart of live view display and line-of-sight detection along with the processing. The upper part of FIG. 10 is the same as the upper parts of FIG. 9, and the line-of-sight detection timings E1 to E11 (middle and lower parts) of FIG. 10 is the same as in FIG. 9. FIG. 10 differs from FIG. 9 in the acquisition timings of second line-of-sight information (middle part) and the acquisition timings of first line-of-sight information (lower part).

In FIG. 10, as shown in the middle part, second line-of-sight information is obtained by removing the gaze positions detected at line-of-sight detection timings E5 and E8 (unprocessed line-of-sight information). Specifically, at each of the acquisition timings C1 to C4, C6, C7, and C9 to C11 corresponding to the line-of-sight detection timings E1 to E4, E6, E7, and E9 to E11, the information of the gaze position detected at the corresponding line-of-sight detection timing is acquired as the second line-of-sight information.

The gaze position detected immediately after the displayed image has been switched in a state where the display update rate is low (display period of images D6 to D10) contains a large error as with the frame F212 of FIG. 8B. It is therefore preferable to perform a thinning process so that such a gaze position (with a large error) will not be used. In FIG. 10, the line-of-sight detection timing E5 is immediately after the displayed image is switched from image D6 to image D7, and the line-of-sight detection timing E8 is immediately after the displayed image is switched from image D8 to image D9. Accordingly, the gaze positions detected at the line-of-sight detection timings E5 and E8 in the middle part of FIG. 10 (unprocessed line-of-sight information) are removed. The thinning process is a process of removing gaze positions detected during a period equal to or longer than a first time or and equal to or less than a second time since the switching of the displayed image when the display update rate is equal to or less than a predetermined value. The thinning process may be a process of removing gaze positions detected during a period within a predetermined time from the switching of the displayed image when the display update rate is equal to or less than a predetermined value.

In FIG. 10, as shown in the lower part, the first line-of-sight information is acquired by removing the gaze position detected at line-of-sight detection timing E5 (unprocessed line-of-sight information). Specifically, at each of the acquisition timings C1' to C4' and C6' to C11' corresponding to the line-of-sight detection timings E1 to E4 and E6 to E11, the information of the gaze position detected at the corresponding line-of-sight detection timing is acquired as the first line-of-sight information. While the gaze position is removed only at the start of the continuous shooting in the illustrated example, the gaze position detected at line-of-sight detection timing E8 may additionally be removed as with the acquisition of the second line-of-sight information.

The condition in which the thinning process is activated is not limited to the display update rate being equal to or less than a predetermined value. As mentioned above, when the object moves largely at the same time as the update of the display, the detected gaze position (unprocessed line-of-sight information) contains an error. Accordingly, the thinning process may be performed when the display update rate is equal to or less than a predetermined value, and the detected amount of movement of the object position is large. By changing gaze positions that are to be removed, the second line-of-sight information for the setting of a focus detection area and the first line-of-sight information for the display of the gaze position can both be acquired in a favorable manner.

In FIG. 10, the second line-of-sight information acquired at acquisition timing C6 or the first line-of-sight information acquired at acquisition timing C6' may be linked to image D7 as the detected line-of-sight information. The original information of these processed line-of-sight information (first line-of-sight information and the second line-of-sight information) is acquired at the line-of-sight detection timing E6 immediately after the displayed image has been switched from image D7 to image D8 (within a first time). Taking into consideration the time the user requires for recognition (time lag between visual perception and recognition by the user), these processed line-of-sight information may be regarded as the line-of-sight information detected during the display of image D7. Similarly, the second line-of-sight information acquired at acquisition timing C9 or the first line-of-sight information acquired at acquisition timing C9' may be linked to image D9 as the detected line-of-sight information.

The difference between the thinning process for acquiring the first line-of-sight information and the thinning process for acquiring the second line-of-sight information can also be regarded as the difference between the acquisition timing of the first line-of-sight information (sample timing) and the acquisition timing of the second line-of-sight information (sample timing). Namely, the difference in the statistical methods may include a difference in sample timing.

Figure 11:
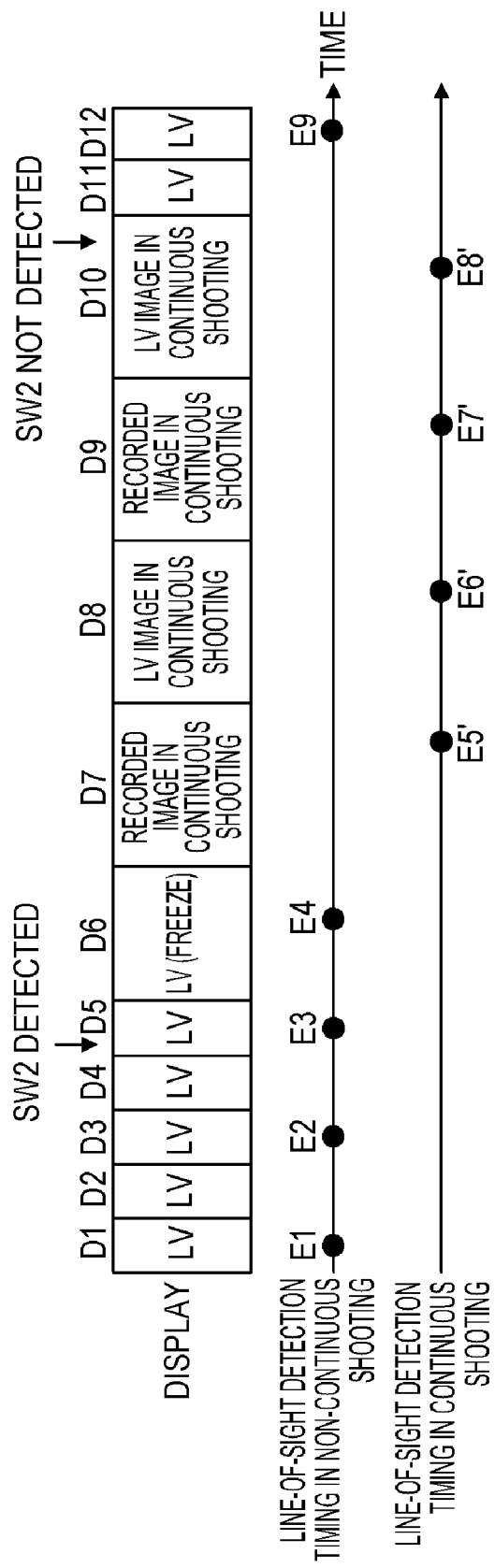
FIG. 11 is a timing chart of live view display and other processes according to the embodiment.

Next, as an example of changing the statistical method, the control of the line-of-sight detection timing is described with reference to FIG. 11. FIG. 11 is one example of a timing chart of live view display and line-of-sight detection. The upper part of FIG. 11 is the same as the upper part of FIG. 9.

The middle part of FIG. 11 illustrates line-of-sight detection timings E1 to E4 and E9 in a state in which shooting including continuous shooting is not being performed. In a state in which shooting including continuous shooting is not being performed, line-of-sight detection is performed at 30 times/sec, in sync with the live view display.

The lower part of FIG. 11 illustrates line-of-sight detection timings E5' to E8'. The gaze positions are detected at a changed detection rate so as to be in sync with the live view display of the continuous shooting (display of images D7 to D10). The synchronizing process (of synchronizing the line-of-sight detection timing with the live view display) is performed again in the transition from the state where no shooting is performed into continuous shooting so as to obtain information that is effective as the user's line-of-sight information (with less error). Specifically, the line-of-sight detection timing E5' is controlled to match the latter half of the display period of the image D7. Similarly, the line-of-sight detection timings E6' to E8' are controlled based on the display periods of the images D6 to D8.

While one example has been described with reference to FIG. 9 to FIG. 11 in which the line-of-sight information is processed or the timing of line-of-sight detection is controlled separately in this embodiment, these processes may be used at the same time. Also, while one example has been described in which the mismatch (error) between the detected gaze position and the user's intended position occurs due to the display update rate or display lag of the live view display, there are other situations where the error may occur. For example, the object in a captured image may be blurred, or hardly visible due to darkness because of a change in the focus state, a change in the aperture condition, exposure settings or a change thereof. In such a case, too, the error may be large, so carrying out the processes described with reference to FIG. 9 to FIG. 11 will be effective.

Variation Example

In the embodiment described above, one example was described in which errors in the gaze position, which occur in a transition from a live view display state before the shooting of a still image into a live view display state of continuous shooting, were taken into account. Errors may occur in the detected gaze position in other situations. For example, the error in the detected gaze position increases depending on the display update rate or display lag of the live view display during the recording of a movie (shooting of a movie). One example of taking errors in the gaze position during movie recording into account will be described with reference to FIG. 12A and FIG. 12B. FIG. 12A and FIG. 12B are one example of a timing chart of live view display periods and line-of-sight detection timings during the recording of a movie.

In FIG. 12A, a movie is recorded at 60 fps, and line-of-sight detection is performed at 30 times/sec (line-of-sight detection timings E1 to E7). The live view display is performed at 60 fps in sync with the movie recording (images D1 to D14). In live view display at 60 fps, the object in the live view image moves smoothly, so that the error in the user's gaze position is small. Therefore, in FIG. 12A, line-of-sight detection is performed in the middle of the display period of one live view image (such as image D1 or image D3).

In FIG. 12B, a movie is recorded at 30 fps, and line-of-sight detection is performed also at 30 times/sec (line-of-sight detection timings E1 to E7). The live view display is performed at 30 fps in sync with the movie recording (images D1 to D7). In live view display at 30 fps, the object in the live view image moves less smoothly, so that the error in the user's gaze position is large. Therefore, in FIG. 12B, line-of-sight detection is performed in the latter half of the display period of one live view image (such as image D1 or image D2). This allows for acquisition of line-of-sight information with less error in the gaze position.

Executing similar control based on a display lag in the live view display during the recording of a movie also allows for acquisition of line-of-sight information that matches the user's intention. With the line-of-sight detection timing synchronized with the live view display, the longer a reference time that is the interval of updating the image displayed in the display unit 28 or the delay time between acquisition of an image and display thereof in the display unit 28, the longer the interval of successive detection of gaze positions. In this case, controlling the line-of-sight detection timing, when the reference time is longer than a predetermined threshold, such that the gaze position is detected at a timing in the latter half of a period of displaying one image in the display unit 28 will allow for acquisition of line-of-sight information that matches the user's intention.

The method of reducing errors in line-of-sight detection is not limited to the control of the line-of-sight detection timing. As mentioned in the embodiment above, the number of samples in the smoothing process (weighted combination) may be increased, or samples assumed to have a large error may be removed, to acquire line-of-sight information with less error. The control of line-of-sight detection timing, weighted combination, thinning process, etc., may be performed in any suitable combination.

In the example described in this embodiment, the acquired first line-of-sight information is used for the display of the gaze position, and the acquired second line-of-sight information with higher sensitivity than the first line-of-sight information is used for the setting of the focus detection area during the shooting of a still image or a movie. The ways in which the line-of-sight information is used (purposes of use) are not limited to these.

For example, the first line-of-sight information may be used for line-of-sight detection when selecting an icon shown on a menu screen or the like in the display unit 28 and giving an operation instruction, while the second line-of-sight information with higher sensitivity than the first line-of-sight information may be used for line-of-sight detection when selecting an object during the shooting of a still image or a movie. This is because, generally, selection of an object that may likely move dynamically requires instantaneity than selection of an icon that stays still at the displayed location.

Even if the same gaze position is displayed and notifying, the first line-of-sight information may be used with a first display frame rate, and the second line-of-sight information with higher sensitivity than the first line-of-sight information may be used with a second frame rate that is higher than the first display frame rate. This is because, with a high display rate, the object is likely to dynamically change the position more frequently so that instantaneity is desirable.

In the case of an user interface that allows selection of a menu icon shown in the display unit 28 based on a gaze position, the first line-of-sight information may be used in a first display state and the second line-of-sight information with higher sensitivity than the first line-of-sight information may be used in a second display state. The second display state is a display state that is at least one of: a state with a fewer number of icons than in the first display state; a state wherein icons are spaced wide apart; and a state wherein icons are large in size. With a large number of icons, or icons spaced close together, or with small icons, higher instantaneity means a higher possibility of a wrong position being selected due to movements such as saccades when selecting an icon. Therefore, lowering the sensitivity in such a display state allows more stable menu selection.

When recording a movie (shooting a movie), each frame may be provided with a record of line-of-sight information about the gaze of the user (photographer) in each frame. This enables automatic extraction and enlargement of an area the photographer was gazing at in a trimming process or an enlarging process, or allows a trimmed area to be changed in accordance with the movement of the photographer's gaze position, during the editing of a movie. When linking line-of-sight information with a movie, it should be taken into consideration that there is a mismatch (delay) between the timing of the display of the image in which the line-of-sight information was acquired and the timing of the recording, for links to be established accurately.

Adding line-of-sight information to a still image will enable a similar trimming process or image processing specifically designed for the area of the gaze (such as correction of brightness or hue).

When recording line-of-sight information in association with a movie or a still image, information such as the detected gaze position, display update rate, and display lag may also be recorded therewith. This will enable the processing of line-of-sight information and control of line-of-sight detection timing as described in this embodiment to be performed as post processing in a personal computer or the like instead of in the imaging apparatus.

According to the present disclosure, processing can be performed favorably based on results of line-of-sight detection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiment described above is merely an example. Any configurations obtained by suitably modifying or changing some configurations of the embodiment (including the orders of process steps) within the scope of the subject matter of the present invention are also included in the present invention. The present invention also includes other configurations obtained by suitably combining various features of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-026018, filed on Feb. 19, 2020, which is hereby incorporated by reference herein in its entirety.

What is claimed is:

1. An electronic device comprising at least one memory and at least one processor which function as:
   an acquisition unit configured to acquire both of a first line-of-sight information and a second line-of-sight information generated by mutually different statistical methods as line-of-sight information relating to a line of sight of a user looking at a display surface; and
   a processing unit configured to perform both of first processing based on the first line-of-sight information and second processing based on the second line-of-sight information, the second processing being different from the first processing.

2. The electronic device according to claim 1, wherein the acquisition unit generates the first line-of-sight information and the second line-of-sight information from a detection result of successively detected lines of sight.

3. The electronic device according to claim 1, wherein a change in the first line-of-sight information relative to a change in the line of sight is less than a change in the second line-of-sight information relative to the change in the line of sight.

4. The electronic device according to claim 1, wherein the first line-of-sight information and the second line-of-sight information are each generated by processing that is able to include a weighted combination of a plurality of lines of sight corresponding to a plurality of timings respectively, and
   a method of the weighted combination for the first line-of-sight information is different from a method of the weighted combination for the second line-of-sight information.

5. The electronic device according to claim 1, wherein the first line-of-sight information and the second line-of-sight information are each generated by processing that is able to include a thinning process on successively detected lines of sight, and
   a method of the thinning process for the first line-of-sight information is different from a method of the thinning process for the second line-of-sight information respectively.

6. The electronic device according to claim 1, wherein the first line-of-sight information and the second line-of-sight information are each generated based on at least one of an interval of updating an image displayed on the display surface and a delay time between acquisition of the image and display thereof on the display surface.

7. The electronic device according to claim 1, wherein the first line-of-sight information and the second line-of-sight information are each generated from a detection result of successively detected lines of sight, and
   the at least one memory and at least one processor further function as a control unit configured to control timings of detecting the lines of sight on a basis of at least one of an interval of updating an image displayed on the display surface and a delay time between acquisition of the image and display thereof on the display surface.

8. The electronic device according to claim 7, wherein the control unit controls timings of detecting the lines of sight such that the longer a reference time, which is the interval of updating an image displayed on the display surface or the delay time between acquisition of the image and display thereof on the display surface, the longer an interval, at which the line of sight is successively detected, and in a case where the reference time is longer than a threshold, the line of sight is detected at a timing in a latter half of a display period of one image on the display surface.

9. The electronic device according to claim 1, wherein the first processing is control for displaying an image on a display surface and displaying a predetermined item at a position, determined based on the first line-of-sight information, on the display surface.

10. The electronic device according to claim 1, wherein the display surface displays a captured image, and
    the second processing is processing for setting an area, where a focus point is detected, in the image.

11. A control method of an electronic device, comprising:
    acquiring both of a first line-of-sight information and a second line-of-sight information generated by mutually different statistical methods as line-of-sight information relating to a line of sight of a user looking at a display surface; and
    performing both of first processing based on the first line-of-sight information and second processing based on the second line-of-sight information the second processing being different from the first processing.

12. A non-transitory computer readable medium that stores a program, wherein the program causes a computer to execute a control method of an electronic device, the control method comprising:
    acquiring both of a first line-of-sight information and a second line-of-sight information generated by mutually different statistical methods as line-of-sight information relating to a line of sight of a user looking at a display surface; and performing both of first processing based on the first line-of-sight information and second processing based on the second line-of-sight information, the second processing being different from the first processing.

13. The electronic device according to claim 1, wherein the acquisition unit acquires the first line-of-sight information and the second line-of-sight information generated in parallel by mutually different statistical methods.

14. The electronic device according to claim 1, wherein the acquisition unit acquires the first line-of-sight information and the second line-of-sight information generated at the same timing by mutually different statistical methods.

* * * * *